United States Patent
Iwasaki et al.

(10) Patent No.: US 7,539,404 B2
(45) Date of Patent: May 26, 2009

(54) CAMERA WITH VIBRATION-PROOFING DEVICE THAT INCLUDES MOVABLE AND FIXED MEMBER WITH PIN-SHAPED SUPPORT MEMBER BETWEEN THEM WITH CURVED SURFACES

(75) Inventors: Takafumi Iwasaki, Saitama (JP); Takayoshi Noji, Saitama (JP)

(73) Assignee: Tamron Co., Ltd., Saitama-shi (JP)

( * ) Notice: Subject to any disclaimer, the term of this patent is extended or adjusted under 35 U.S.C. 154(b) by 387 days.

(21) Appl. No.: 11/566,490

(22) Filed: Dec. 4, 2006

(65) Prior Publication Data
US 2007/0127907 A1    Jun. 7, 2007

(30) Foreign Application Priority Data
Dec. 5, 2005    (JP)    ............... 2005-350346

(51) Int. Cl.
G03B 17/00    (2006.01)
G02B 27/64    (2006.01)
(52) U.S. Cl. .................. 396/55; 348/208.99; 359/554
(58) Field of Classification Search ............ 396/52–55; 348/208.7, 208.8, 208.11, 208.99; 318/599, 318/653; 359/554–557
See application file for complete search history.

(56) References Cited

U.S. PATENT DOCUMENTS

| 5,266,988 | A * | 11/1993 | Washisu ..................... 396/55 |
| 5,717,960 | A * | 2/1998 | Tomita et al. ................ 396/55 |
| 6,603,927 | B2 * | 8/2003 | Enomoto ..................... 396/55 |
| 7,315,015 | B2 * | 1/2008 | Hsieh et al. ............... 250/208.1 |
| 7,327,952 | B2 * | 2/2008 | Enomoto ..................... 396/55 |
| 2005/0254806 | A1 * | 11/2005 | Noguchi ..................... 396/55 |

FOREIGN PATENT DOCUMENTS

JP    3-186823 A    8/1991

* cited by examiner

*Primary Examiner*—Jay M Patidar
(74) *Attorney, Agent, or Firm*—Foley & Lardner LLP

(57) ABSTRACT

A parallel moving device includes a fixed plate provided on a housing side, a moving frame provided on an optical system side, and three pin-shaped members each of which is provided between the fixed plate and the moving frame and has one end coming into contact the fixed plate and the other end coming into contact the moving frame to support these members, the pin-shaped members allowing the moving frame to move in a direction substantially perpendicular to an optical axis of the optical system. Each of these pin-shaped members supports the moving frame in parallel to the fixed plate, has ends that contact the fixed plate and the moving frame and that have curved surfaces, and tilts in the substantially perpendicular direction in response to movement of the moving frame about the one end as a fulcrum.

10 Claims, 25 Drawing Sheets

A-A CROSS SECTION

A-A CROSS SECTION

B-B CROSS SECTION

B-B CROSS SECTION

CAMERA WITH VIBRATION-PROOFING DEVICE THAT INCLUDES MOVABLE AND FIXED MEMBER WITH PIN-SHAPED SUPPORT MEMBER BETWEEN THEM WITH CURVED SURFACES

BACKGROUND OF THE INVENTION

1. Field of the Invention

The present invention relates to a parallel moving device, and an actuator, a lens unit, and a camera that includes the parallel moving device.

2. Description of the Related Art

In a lens device provided with an imaging lens such as a variable magnification lens often employ a vibration-proofing device that prevents image blur caused by vibration due to hand jiggling, etc. In this type of vibration-proofing device, for example, the image blur is prevented by detecting vibration of a lens barrel housing an imaging lens, and by driving a correction lens on a plane parallel with a film so as not to cause the image blur based on the detected vibration. This type of vibration-proofing device is usually provided with a parallel moving mechanism that translates the correcting lens on a predetermined plane.

This type of parallel moving mechanism has, for example, a structure as follows. The parallel moving mechanism of a vibration-proofing device includes a fixed frame on which a correction lens is fixed, a first holding frame that slidably supports this fixed frame in a first direction perpendicular to an optical axis, and a second holding frame that slidably holds this first holding frame in a second direction substantially perpendicular to the optical axis and the first direction and that is fixed to the lens barrel.

And the correction lens is supported capable of a translational motion in an arbitrary direction in a plane parallel with a film with respect to the lens barrel by combining motions in the first and the second directions orthogonal to each other. Moreover, the vibration-proofing device provided with this type of parallel moving mechanism includes linear motors prepared exclusively for driving the correction lens in the first direction and the second direction, respectively, and the correction lens is moved in an arbitrary direction by combining driving amounts by these linear motors.

Also, in a lens device having an image blur preventing function by this type of vibration-proofing device, the parallel moving mechanism that supports the correction lens capable of parallel movement is provided with a combination of a guide unit that slidably guides the correction lens in a predetermined direction and a driving unit that drives the correction lens in that direction in each of the orthogonally crossing two directions (an X direction and a Y direction, for example) so as to move the correction lens in an arbitrary direction and to prevent the image blur (for example, Japanese Patent Application Laid-Open Publication No. H3-186823).

However, the conventional vibration-proofing device described in the above patent document has a problem that since the image blur is prevented by the parallel moving mechanism constructed by combining the guide unit arranged in the two directions orthogonal to each other and the driving units in those directions, a support mechanism of the fixed frame, and the holding frame can be complicated, for example. And if the support mechanism becomes complicated, weight of a movable part of the parallel moving mechanism increases, there by making high-speed and linear parallel movement difficult.

Furthermore, since sliding resistance is generated between the parallel moving mechanism and the guide unit in the conventional vibration-proofing device, controllability of the parallel moving mechanism is deteriorated. Moreover, an actuator using the guide units can move a movable part translationally in an arbitrary direction on a predetermined plane but the actuator can not move the movable part rotationally around the optical axis.

The guide unit or the support mechanism of the parallel moving mechanism in this structure requires some clearance to enable movement with small friction. Therefore, unintentional movement in a space corresponding to this clearance may occur, thereby causing a positioning error. In addition, if such clearance is provided, a load relating to driving is different between movement without contact between members and movement while sliding, thereby deteriorating control accuracy.

SUMMARY OF THE INVENTION

It is an object of the present invention to at least solve the above problems in the conventional technologies.

A parallel moving device according to one aspect of the present invention includes a fixed member that is provided on a side of a casing; a movable member provided on a side of an optical system; and a support member that is provided between the fixed member and the movable member to support both of the fixed member and the movable member in such a manner that one end contacts the fixed member and another end contacts the movable member while enabling movement of the movable member in a direction substantially perpendicular to an optical axis of the optical system. The support member is constituted of a pin-shaped member that supports the movable member in parallel with respect to the fixed member, of which ends that contact the fixed member and the movable member respectively have curved surfaces, and that tilts in the substantially perpendicular direction in response to movement of the movable member about the one end as a fulcrum.

An actuator according to another aspect of the present invention includes a fixed member that is provided on a side of a casing; a movable member provided on a side of an optical system; a support member that is provided between the fixed member and the movable member to support both of the fixed member and the movable member so that one end contacts the fixed member and another end contacts the movable member while enabling movement of the movable member in a direction substantially perpendicular to an optical axis of the optical system; at least three driving coils that are provided at either one of the fixed member and the movable member; a plurality of driving magnets that are provided at another one of the fixed member and the movable member such that each of the driving magnets is arranged at a portion corresponding to the driving coils respectively; a position detecting unit that detects positions of the driving magnets with respect to the driving coils based on action of a magnetic field; and a control unit that generates a coil position signal for each of the driving coils based on a signal indicating a position to which the movable member is to be moved so as to cancel vibration externally applied, and that controls a driving current to be fed to each of the driving coils, based on the coil position signal and a result of detection by the position detecting unit. The support member is constituted of a pin-shaped member that supports the movable member in parallel with respect to the fixed member, of which ends that contact the fixed member and the movable member respectively have curved surfaces, and that tilts in the substantially perpendicular direction between the fixed member and the movable member in response to movement of the movable member about the one end as a fulcrum.

A lens unit according to still another aspect of the present invention includes a lens barrel that accommodates a lens; a fixed member that is mounted on the lens barrel; a movable member on which an image stabilizing lens is mounted; a support member that is provided between the fixed member and the movable member to support both of the fixed member and the movable member so that one end contacts the fixed member and another end contacts the movable member while enabling movement of the movable member in a direction substantially perpendicular to an optical axis of the optical system; at least three driving coils that are provided at either one of the fixed member and the movable member; a plurality of driving magnets that are provided at another one of the fixed member and the movable member such that each of the driving magnets is arranged at a portion corresponding to one of the driving coils respectively; a position detecting unit that detects positions of the driving magnets with respect to the driving coils based on action of a magnetic field; a vibration detecting unit that detects vibration of the lens barrel; a lens position signal generating unit that generates a lens position signal indicating a position to which the image stabilizing lens is to be moved, based on a result of detection by the vibration detecting unit; and a control unit that generates a coil position signal for each of the driving coils based on the lens position signal, and that controls a driving current to be fed to each of the driving coils, based on the coil position signal and a result of detection by the position detecting unit. The support member is formed of a pin-shaped member that supports the movable member in parallel with respect to the fixed member, of which ends that contact the fixed member and the movable member respectively have curved surfaces, and that tilts in the substantially perpendicular direction in response to movement of the movable member about the one end as a fulcrum.

A camera according to still another aspect of the present invention includes a lens unit according to the above aspect.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments according to the present invention will be explained in detail below with respect to the accompanying drawings.

Figure 1:
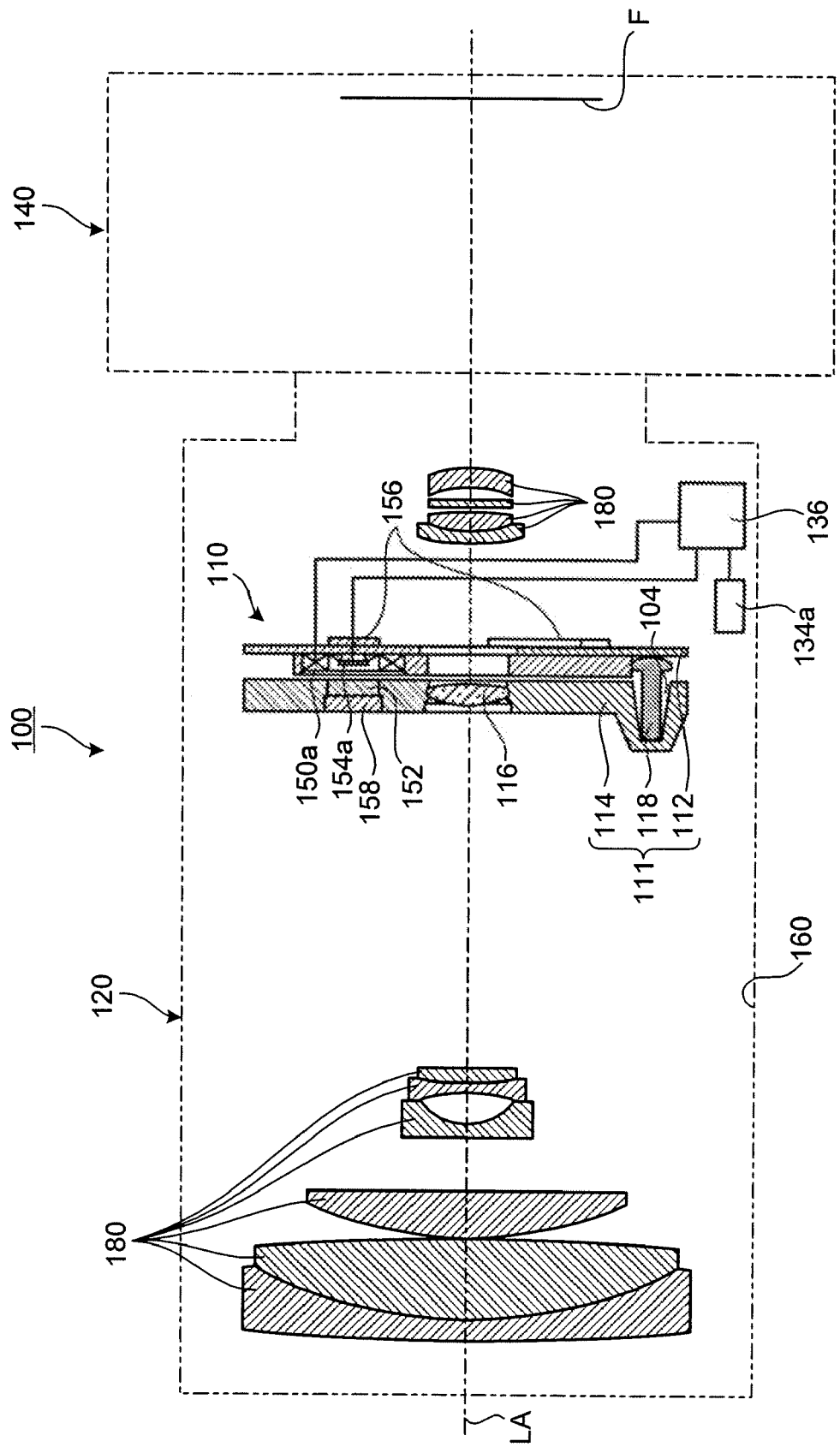
FIG. 1 is a cross-section of a camera according to a first embodiment of the present invention.

FIG. 1 is a cross-section of a camera according to a first embodiment of the present invention. As shown in FIG. 1, a camera 100 includes a lens unit 120 and a camera body 140. The lens unit 120 includes a lens barrel 160 having an enclosure formed in a cylindrical shape, for example, an imaging lens 180 constituted of a plurality of lenses disposed inside the lens barrel 160, an actuator 110 that moves an image stabilizing lens 116 in a predetermined plane, and gyros 134a, 134b (only the gyro 134a is shown in FIG. 1) as a vibration detecting unit that detects vibration of the lens barrel 160.

In the camera 100 constructed as above, vibration of the lens barrel 160 is detected by the gyros 134a, 134b, and the actuator 110 is operated based on the detected vibration so as to move the image stabilizing lens 116 in an arbitrary direction in a plane in a direction substantially perpendicular to an optical axis LA so that an image focused on a film face F of the camera body 140 is stabilized. The actuator 110 includes a parallel moving device 111, which will be described later, having a fixed plate 112 fixed to the lens barrel 160, a moving frame 114 on which the image stabilizing lens 116 is mounted, and a pin-shaped member 118 that supports them in parallel and a driving unit.

In the camera 100 according to this first embodiment, a piezoelectric vibration gyro is used as the gyros 134a, 134b, but gyros in other structures may be used. The image stabilizing lens 116 includes a single lens in this first embodiment, but it may include a plurality of lenses to stabilize an image to be focused on the film face F. In the following, the image stabilizing lens 116 includes a lens group included by a plurality of lenses as well as a single lens for stabilizing an image.

Figure 2:
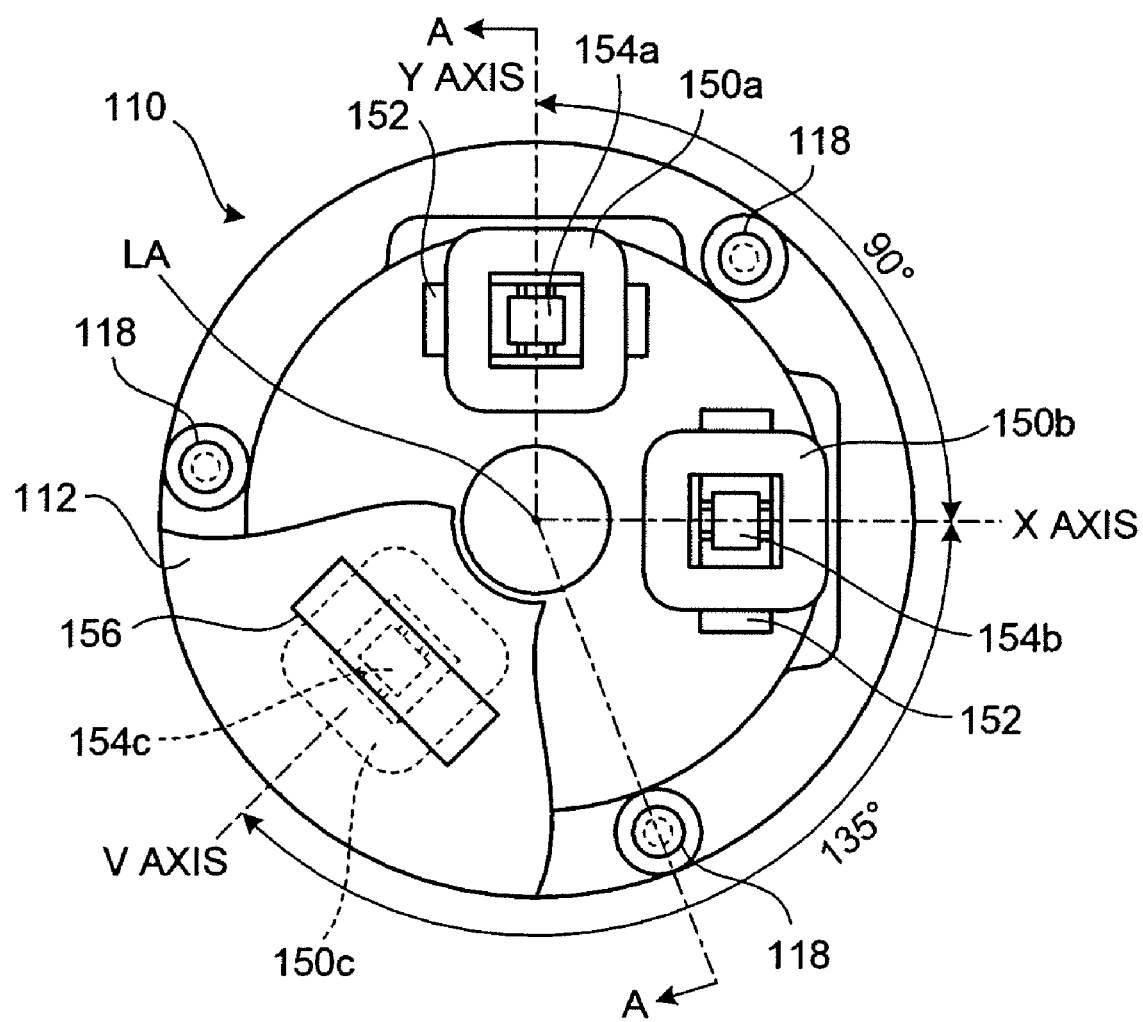
FIG. 2 is a cross-section of a front part of an actuator in the camera according to the first embodiment.
Figure 3:
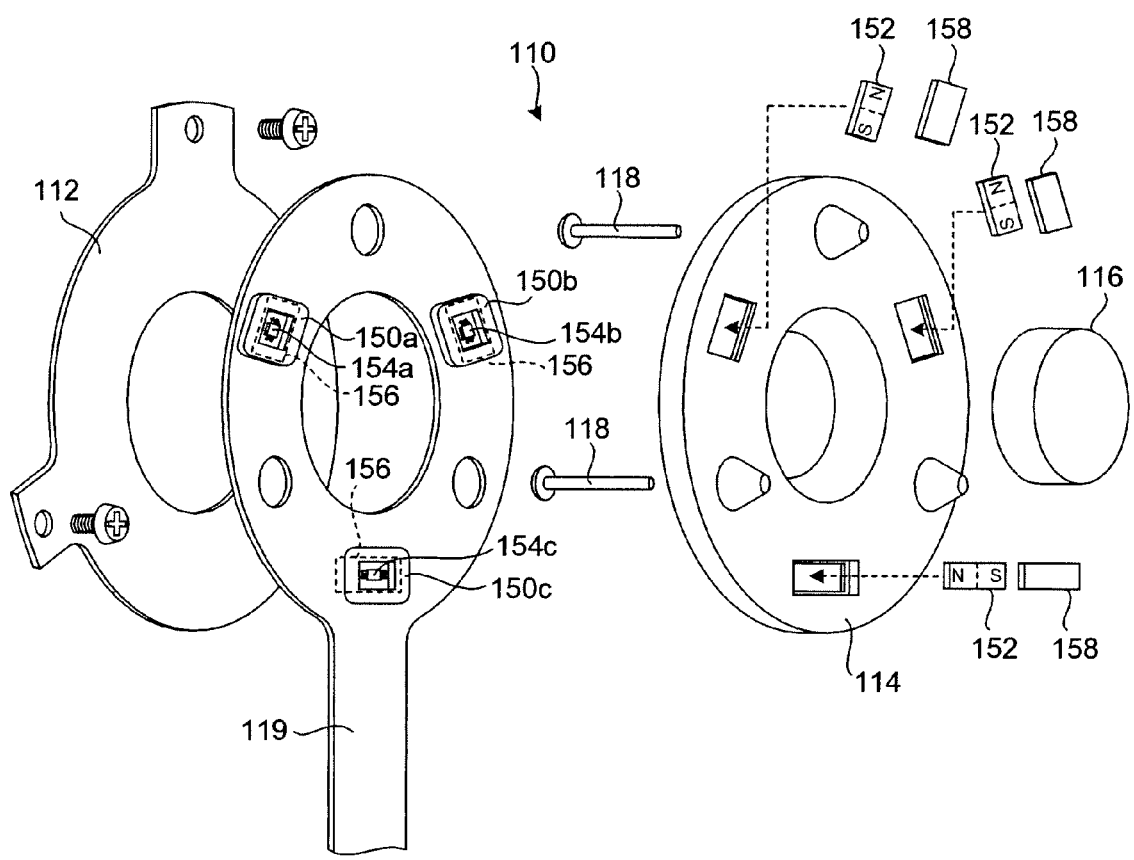
FIG. 3 is an exploded view of the actuator according to the first embodiment.
Figure 4:
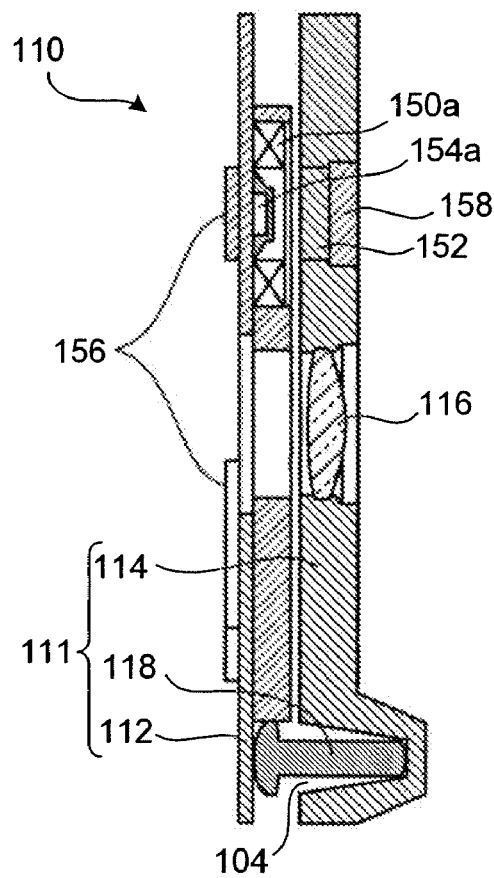
FIG. 4 is a cross-section of the actuator taken along a line A-A shown in FIG. 2.
Figure 5:
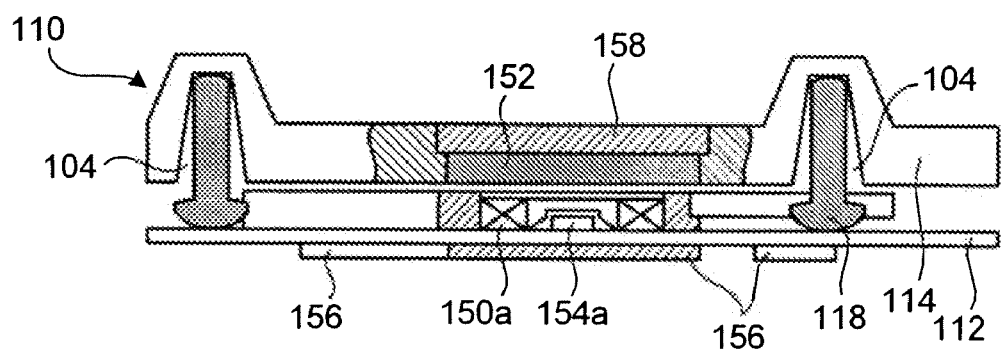
FIG. 5 is a cross-section of the actuator.

FIG. 2 is a cross-section of a front part of the actuator provided in the camera according to the first embodiment. FIG. 3 is an exploded view of the actuator. FIG. 4 is a cross-section of the actuator taken along a line A-A shown in FIG. 2. FIG. 5 is a partial side cross-section of the actuator.

FIG. 2 illustrates the actuator 110 viewed from the film face F side of the camera body 140 in FIG. 1, and the fixed plate 112 of the actuator 110 is shown in the partially broken manner, but this view is referred to as a front view for convenience.

As shown in FIGS. 2 to 5, the actuator 110 includes the parallel moving device 111 including the fixed plate 112 as a fixed member fixed in the lens barrel 160 of the camera 100, the moving frame 114 as a movable member movably supported with respect to this fixed plate 112, and the pin-shaped members 118 formed of pin-shaped members as support members that support this moving frame 114 in parallel with the fixed plate 112.

Arranging the plurality of pin-shaped members 118 as support members between the fixed plate 112 and the moving frame 114 can suffice, and three pin-shaped members are arranged in this example. Furthermore, these three pin-shaped members 118 constitute a movable member supporting unit that supports the moving frame 114 as the movable member with respect to the fixed plate 112 as the fixed member. These pin-shaped members 118 support the fixed plate 112 and the moving frame 114 in an aligned state in such a manner that thickness directions of these members become parallel to the optical axis LA. Both ends of each of these pin-shaped members 118 in the axial direction are formed with, e.g., curved surfaces that contact the fixed plate 112 and the moving frame 114 respectively.

It is to be noted that each concave portion 104 (see FIGS. 1, 4, and 5) having an opening in a direction opposed to the fixed plate 112 is formed in the moving frame 114 at a position where each pin-shaped member 118 is arranged. The pin-shaped member 118 is arranged in such a manner that one end thereof contacts with the fixed plate 112 and the other end thereof contacts with an innermost portion in this concave portion 104 along a direction of the optical axis LA. Furthermore, this concave portion 104 may be formed with an opening so as to face the moving frame 114 in the fixed plate 112 at a position where the pin-shaped member 118 is arranged, or may be formed in the fixed plate 112 alone.

When the concave portion 104 is provided in at least one of the fixed plate 112 and the moving frame 114 at the position where each pin-shaped member 118 is arranged, both the fixed plate 112 and the moving frame 114 can be supported in parallel to form a predetermined gap therebetween in a state an axial length of each pin-shaped member 118 is assured to some extent. Upon movement of the moving frame 114, these pin-shaped members 118 tilt in a direction substantially perpendicular to the optical axis LA in response to movement of the moving frame 114 about the ends contacting the fixed plate 112 as fulcrums.

Therefore, the moving frame 114 does not come into contact the fixed plate 112 when moving the moving frame 114, and the moving frame 114 can be moved while assuring a sufficient amount of tilt of the pin-shaped members 118, thus smoothly moving the moving frame 114 at a high speed.

The actuator 110 includes, e.g., three driving coils 150a, 150b, and 150c disposed to the fixed plate 112 through a flexible substrate 119 (see FIG. 3), three driving magnets 152 formed of permanent magnets respectively attached at positions corresponding to these three driving coils 150a to 150c in the moving frame 114, and magnetic sensors 154a, 154b, and 154c as position detecting units arranged on the inner sides of the respective driving coils 150a to 150c to detect positions of the driving magnets 152 corresponding to the driving coils 150a to 150c.

Moreover, the actuator 110 has attracting yokes 156 disposed at positions corresponding to the respective driving magnets 152 in the fixed plate 112 to attract the moving frame 114 to the fixed plate 112 through magnetic forces from the respective driving magnets 152, and back yokes 158 (see FIGS. 3 to 5) disposed on the rear sides of the respective driving magnets 152 to effectively direct magnetic forces from the respective driving magnets 152 toward the fixed plate 112.

It is to be noted that the respective driving coils 150a to 150c on the fixed plate 112 side and the respective driving magnets 152 at the positions corresponding to these coils on the moving frame 114 side constitute a driving unit that translates or rotates the moving frame 114 with respect to the fixed plate 112. Each driving magnet 152 functions as a member magnet that allows the moving frame 114 to be attracted to the fixed plate 112, and each attracting yoke 156 functions as a magnetic body that is attracted by the member magnet.

As shown in FIG. 1, the actuator 110 further has a controller 136 as a control unit that controls a driving current flowing through each of the driving coils 150a to 150c on the fixed plate 112 side based on a vibration of the lens barrel 160 detected by the gyros 134a and 134b and a position detection result (positional information) of the moving frame 114 detected by each of the magnetic sensors 154a to 154c.

It is to be noted that the lens unit 120 in the camera 100 according to the first embodiment is disposed to the camera main body 140 to thereby form an image of light that enters the lens barrel 160 on the film plane F in the camera main body 140 through the imaging lens 180 or the image stabilizing lens 116. The imaging lens 180 formed of the lenses as explained above is held in the lens barrel 160 in this lens unit 120, and moving at least some lenses in the imaging lens 180 in the direction of the optical axis LA enables so-called focus adjustment.

The actuator 110 thus configured is driven in the following manner. That is, the moving frame 114 is moved within a plane parallel to the film plane F in the camera main body 140 with respect to the fixed plate 112 fixed to the lens barrel 160 to further move the image stabilizing lens 116 disposed on the moving frame 114. Even if the lens barrel 160 vibrates, an image formed on the film plane F is not distorted. A movement operation by the parallel moving device 111 in the actuator 110 and a structure of the pin-shaped member 118 will now be explained.

Figure 6A:
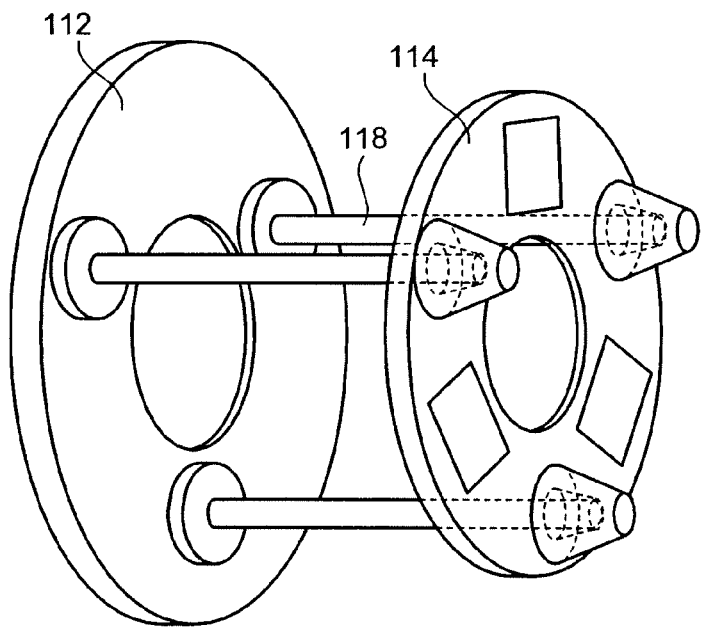
FIG. 6A is a perspective view of a parallel moving device provided at the actuator provided at the camera according to the first embodiment of the present invention.
Figure 6B:
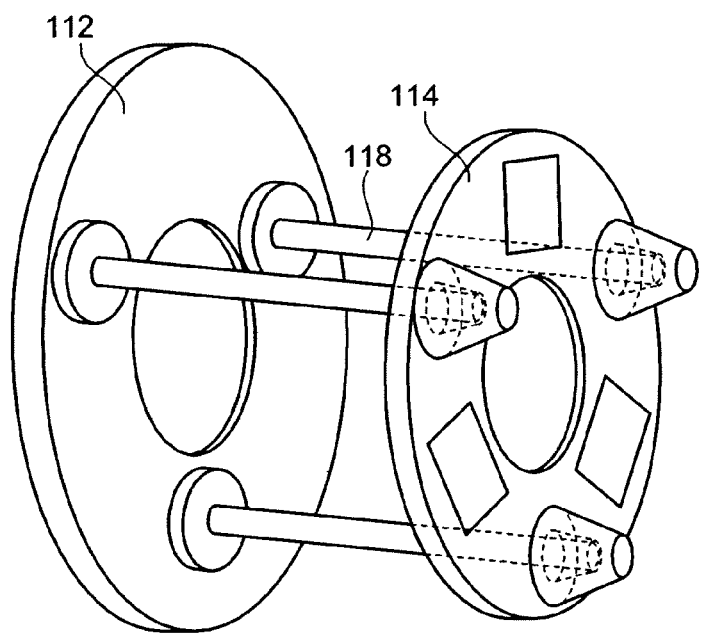
FIG. 6B is a perspective view of a parallel moving device provided at the actuator provided at the camera according to the first embodiment.

FIGS. 6A and 6B are perspective views of the parallel moving device included in the actuator. When the actuator 110 does not drive the moving frame 114, the moving frame 114 is supported in parallel with respect to the fixed plate 112 by the three pin-shaped members 118 that are in, e.g., an erected state as shown in FIG. 6A.

On the other hand, when the actuator 110 drives the moving frame 114, as shown in FIG. 6B, the three pin-shaped members 118 tilt in a moving direction of the moving frame 114, whereby the moving frame 114 is supported in parallel and moved in parallel with respect to the fixed plate 112. As a result, the moving frame 114 can be translated or rotated within a plane parallel to the fixed plate 112 without restraint.

Figure 7A:
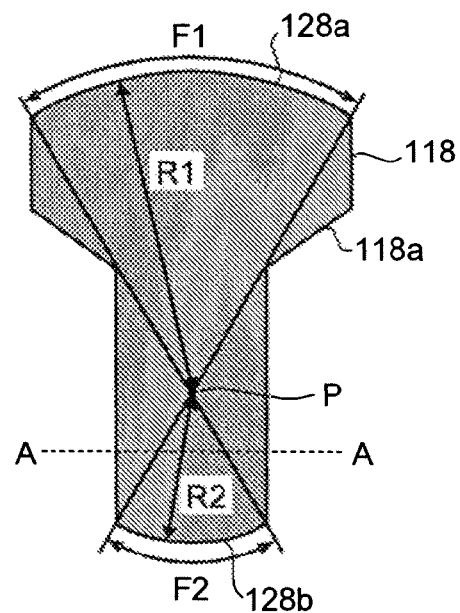
FIG. 7A is a side view of a pin-shaped member in the parallel moving device.
Figure 7B:
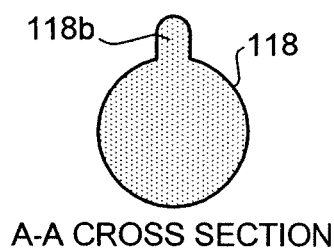
FIG. 7B illustrates a form of the pin-shaped member on a cross-section taken along a line A-A show in FIG. 7A.
Figure 7C:
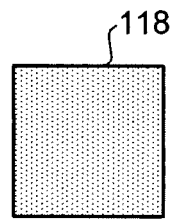
FIG. 7C illustrates another form of the pin-shaped member on the cross-section taken along the line A-A.
Figure 8A:
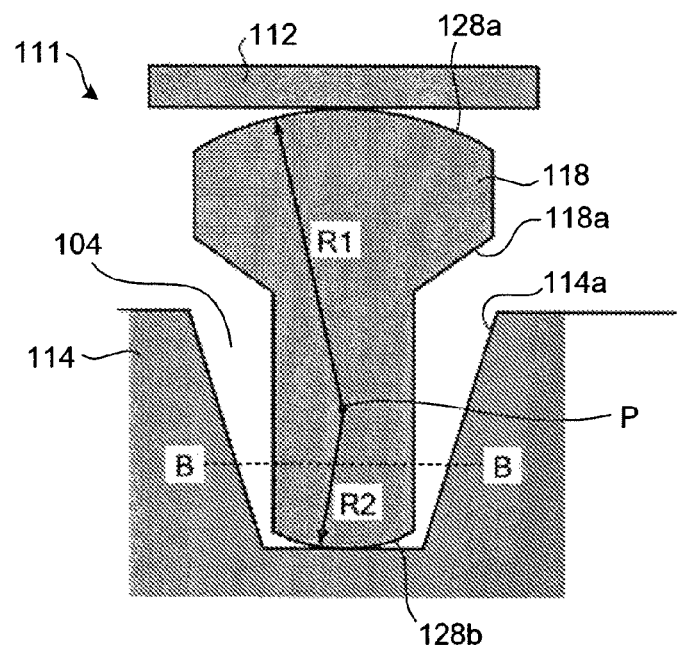
FIG. 8A is a side view of the parallel moving device.
Figure 8B:
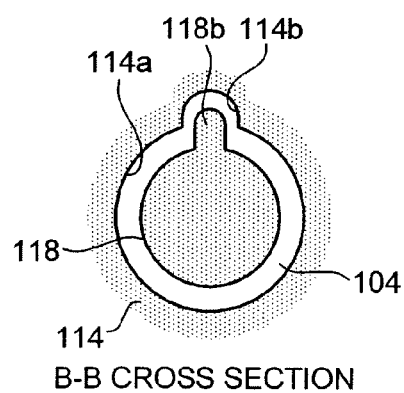
FIG. 8B illustrates a form of the parallel moving device on a cross-section taken along a line B-B shown in FIG. 8A.
Figure 8C:
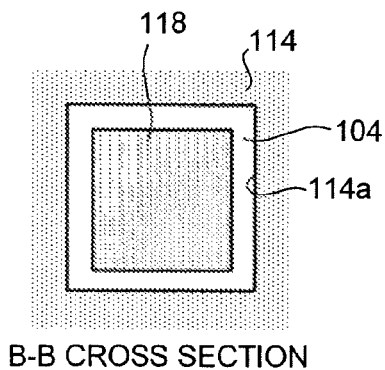
FIG. 8C illustrates another form of the parallel moving device on the cross-section taken along the line B-B.
Figure 9:
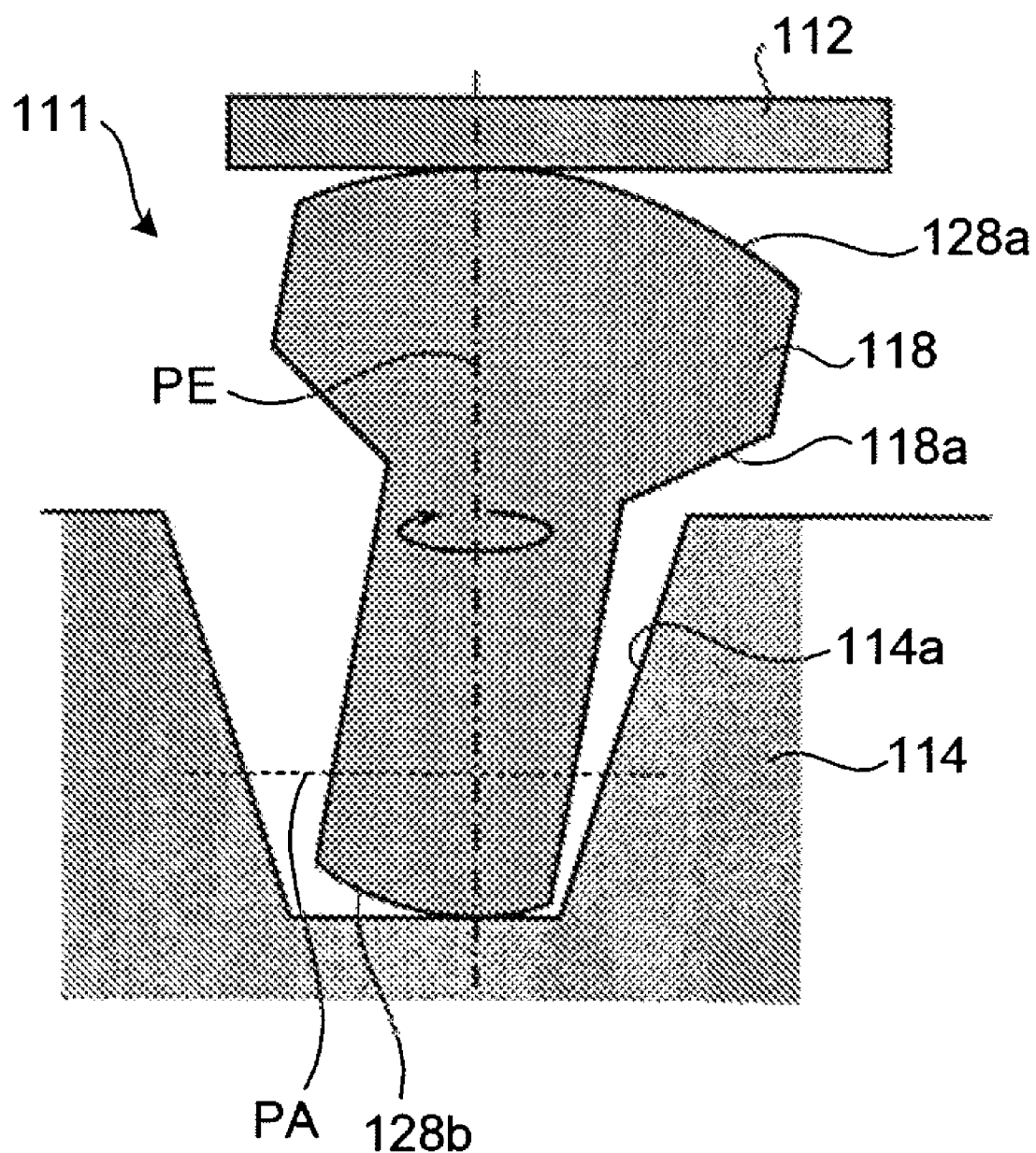
FIG. 9 is a schematic for explaining a rotational movement of the pin-shaped member.

FIG. 7A is a side view of the pin-shaped member in the parallel moving device. Additionally, FIG. 7B is a view of the shape in a cross section taken along a line A-A shown in FIG. 7A. FIG. 7C is a view of another shape in the cross section taken along the line A-A shown in FIG. 7A. FIG. 8A is a side view of the parallel moving device. FIG. 8B is a view of a shape in a cross section taken along a line B-B shown in FIG. 8A. FIG. 8C is a view of another shape in the cross section taken along the line B-B shown in FIG. 8A. FIG. 9 is a view for explaining a rotational operation of the pin-shaped member.

The pin-shaped member 118 has a structure obtained by, e.g., coupling a plurality of cylindrical members having a substantially circular cross section taken along the line A-A in a direction substantially perpendicular to the optical axis LA (not shown) and different diameters as shown in FIGS. 7A and 7B, or coupling a plurality of columnar members having a cross section taken along the line A-A forming a substantially rectangular shape and different peripheral lengths as shown in FIGS. 7A and 7C.

This pin-shaped member 118 includes a curved surface 128a having an effective contact range F1 at one end that is in contact with the fixed plate 112, and a curved surface 128b having an effective contact range F2 narrower than the effective contact range F1 at the other end that is in contact with the moving frame 114. When the pin-shaped member 118 is formed of cylindrical members, an engagement convex portion 118b (see FIG. 7B) composed of a protrusion constituting a part of a later-described rotation preventing unit is formed on a lateral outer peripheral surface of a pin-shaped member 18 where the curved surface 128b is formed.

It is to be noted that the curved surface 128a at the one end of the pin-shaped member 118 has a shape obtained by cutting out a portion corresponding to the effective contact range F1 from a spherical body having a radius R1, and the curved surface 128b at the other end of the same has a shape obtained by cutting out a portion corresponding to the effective contact range F2 from a spherical body having a radius R2 smaller than the radius R1. The spherical bodies forming these curved surfaces 128a and 128b share a central point P. Therefore, a curvature of the curved surface 128a is configured to be smaller than a counterpart of the curved surface 128b.

As shown in FIG. 8A, the pin-shaped member 118 is arranged between the fixed plate 112 and the moving frame 114 in a state where the curved surface 128a is in contact with the fixed plate 112 and the curved surface 128b is in contact with the moving frame 114, thereby constituting the parallel moving device 111. Since the curvature of the curved surface 128a is configured to be smaller than the curvature of the curved surface 128b in the pin-shaped member 118 as explained above, a contact pressure per unit area applied to the curved surface 128a can be reduced to be smaller than a contact pressure per unit area applied to the curved surface 128b.

A shape of an inner wall 114a in the concave portion 104 of the moving frame 114 restricts a tilt range of the pin-shaped member 118 in a direction substantially perpendicular to the optical axis LA (not shown), thus preventing the moving frame 114 from moving in parallel beyond a moving range. It is to be noted that, when the pin-shaped member 118 tilts in the direction substantially perpendicular to the optical axis LA at the maximum level, a distance between a tapered surface 118a of the pin-shaped member 118 and an opening rim of the concave portion 104 is minimum.

As shown in FIGS. 8A and 8B, when the pin-shaped member 118 is formed of cylindrical members each having a circular cross section, the concave portion 104 is formed with a shape having the circular inner wall 114a that accommodates a part of the pin-shaped member 118 on the curved surface 128b side excluding the engagement convex portion 118b and a semicircular inner wall 114b that accommodates the engagement convex portion 118b in a cross section taken along the line B-B.

As shown in FIGS. 8A and 8C, when the pin-shaped member 118 is formed of columnar members each having a rectangular cross section, the concave portion 104 is formed with a shape having the rectangular inner wall 114a that accommodates a part of the pin-shaped member 118 on the curved surface 128b side in the cross section taken along the line B-B. The inner walls 114a and 114b thus formed of the concave portion 104 as well as the engagement convex portion 118b constitute a rotation preventing unit.

As shown in FIG. 9, the rotation preventing unit prevents the pin-shaped member 118 from rotating around a PE direction as an axial center substantially parallel to the optical axis LA. That is because the curved surfaces 128a and 128b of the pin-shaped member 118 are respectively in contact with the fixed plate 112 and the moving frame 114 when the moving frame 114 moves in parallel along a PA direction substantially perpendicular to the optical axis LA (not shown) in the parallel moving device 111. When the pin-shaped member 118 rotates, the pin-shaped member 118 and the concave portion 104 may come into contact each other at an unintended position even in a movement range of the moving frame 114 to avoid movement of the moving frame. This rotation preventing unit can, however, effectively prevent such inconvenience.

Specifically, even if the pin-shaped member 118 starts rotation, for example, the engagement convex portion 118*b* of the pin-shaped member 118 comes into contact the inner wall 114*b* of the concave portion 104 as shown in FIG. 8B, or the lateral outer peripheral surface of the pin-shaped member 118 directly gets contact the inner wall 114*a* of the concave portion 104 as shown in FIG. 8C, whereby rotation of the pin-shaped member 118 around the PE direction as the axial center is avoided.

Figure 10:
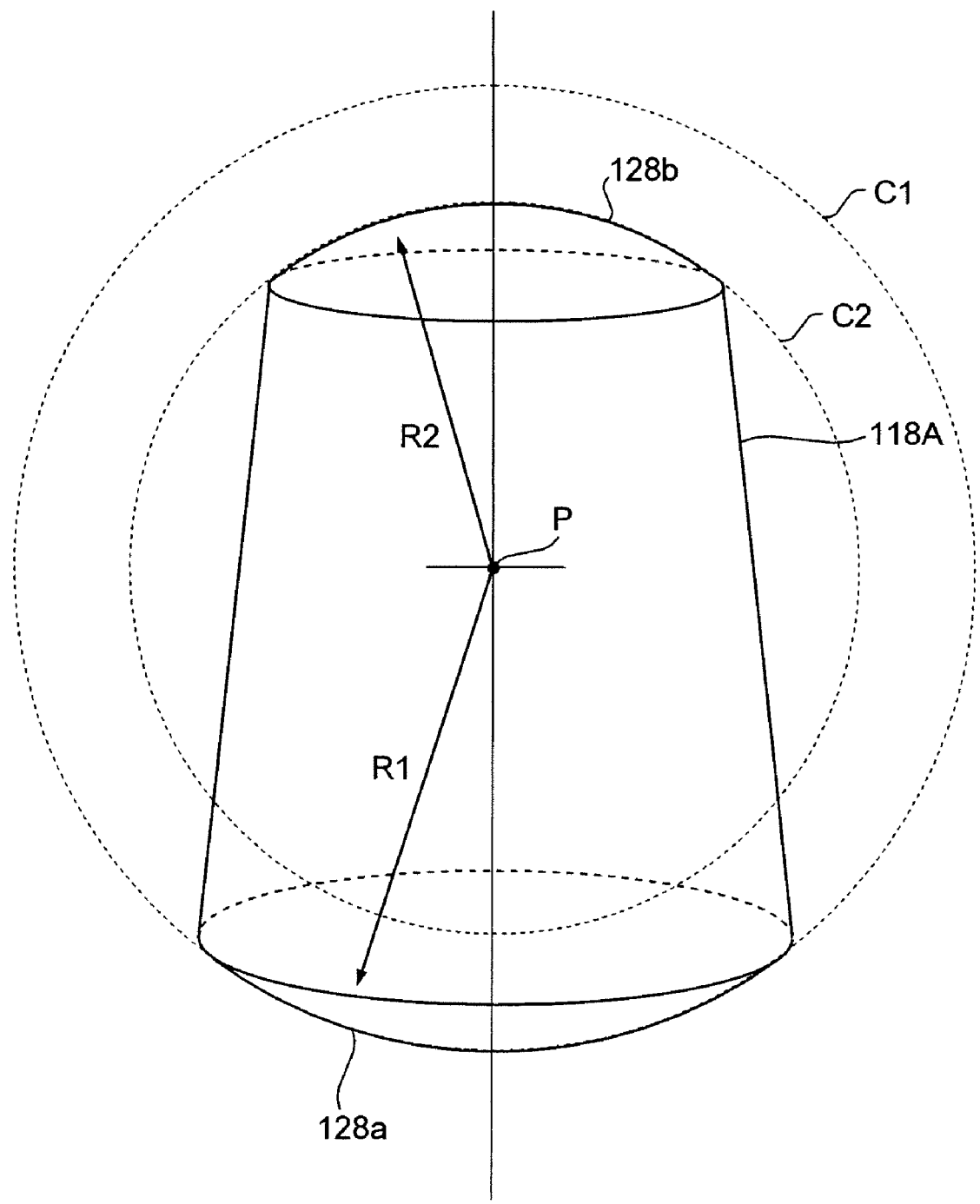
FIG. 10 is a perspective view of another pin-shaped member in the parallel moving device.
Figure 11:
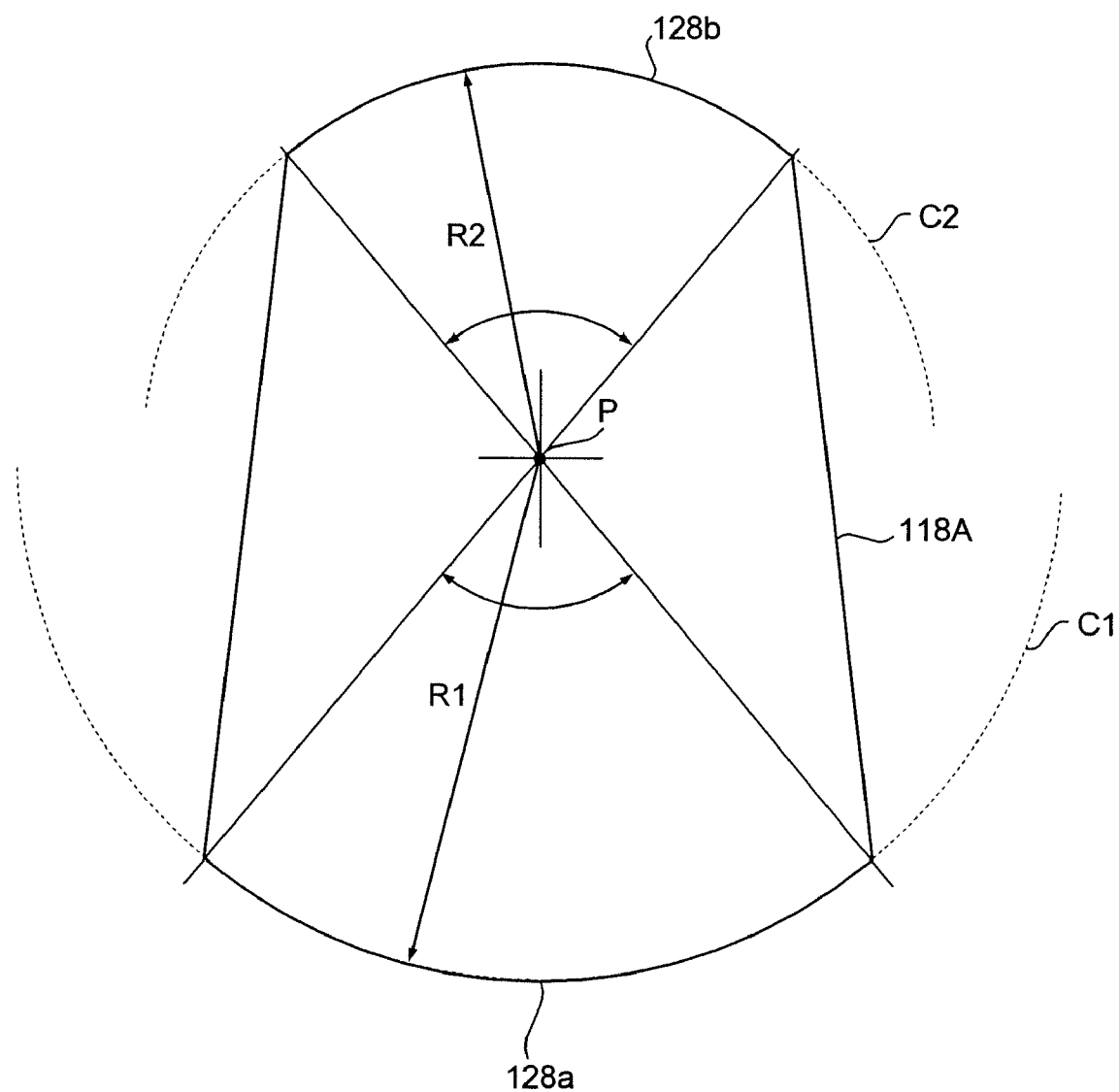
FIG. 11 is a side view of another pin-shaped member in the parallel moving device.
Figure 12:
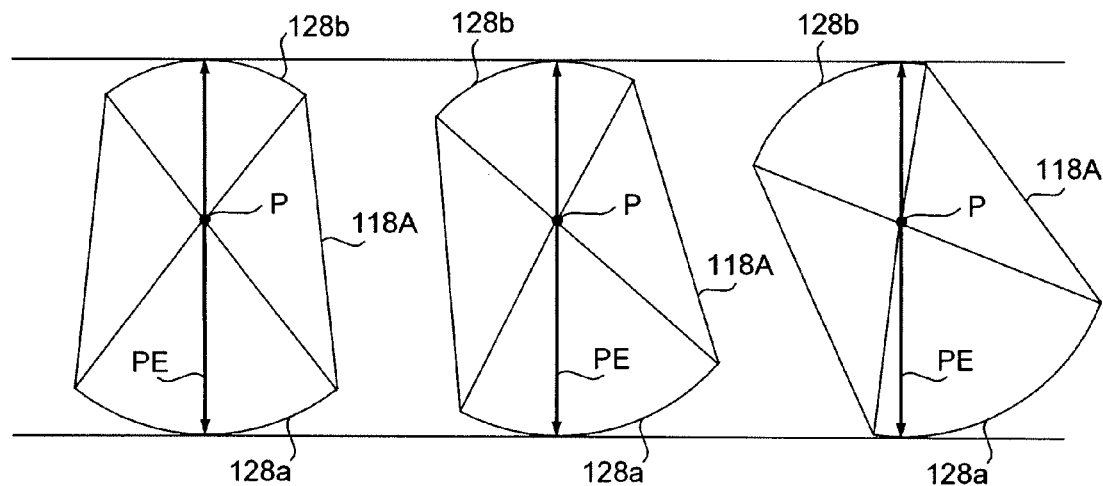
FIG. 12 is a schematic for explaining an operation of another pin-shaped member in the parallel moving device.
Figure 13:
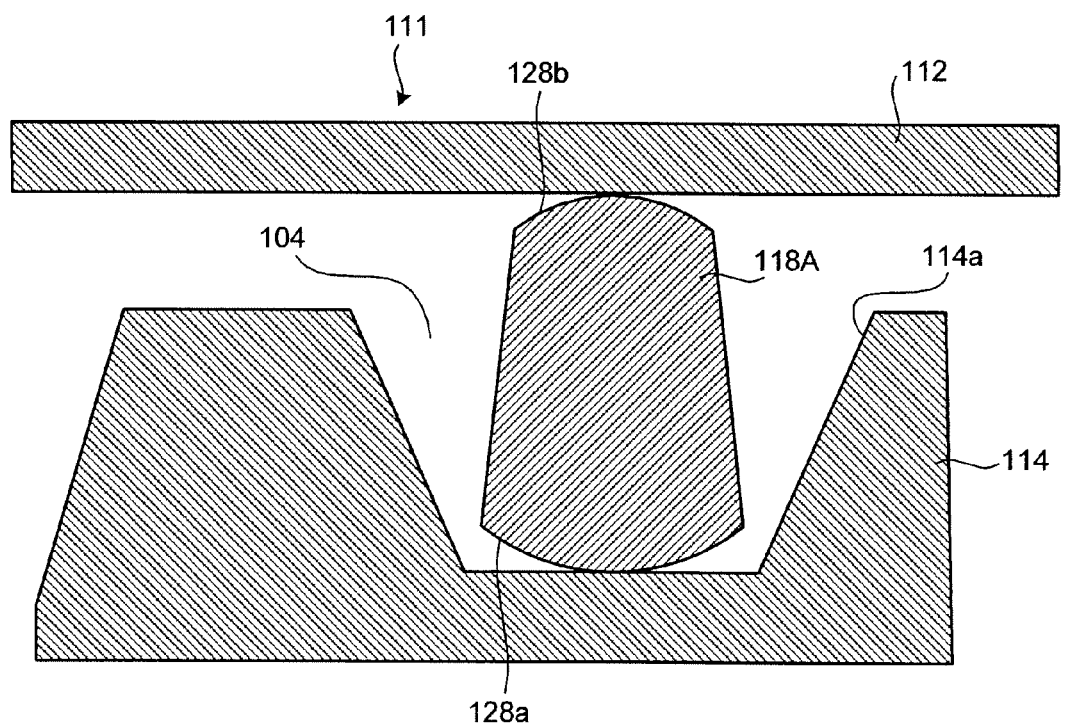
FIG. 13 is a side view of the parallel moving device having another pin-shaped member.
Figure 14:
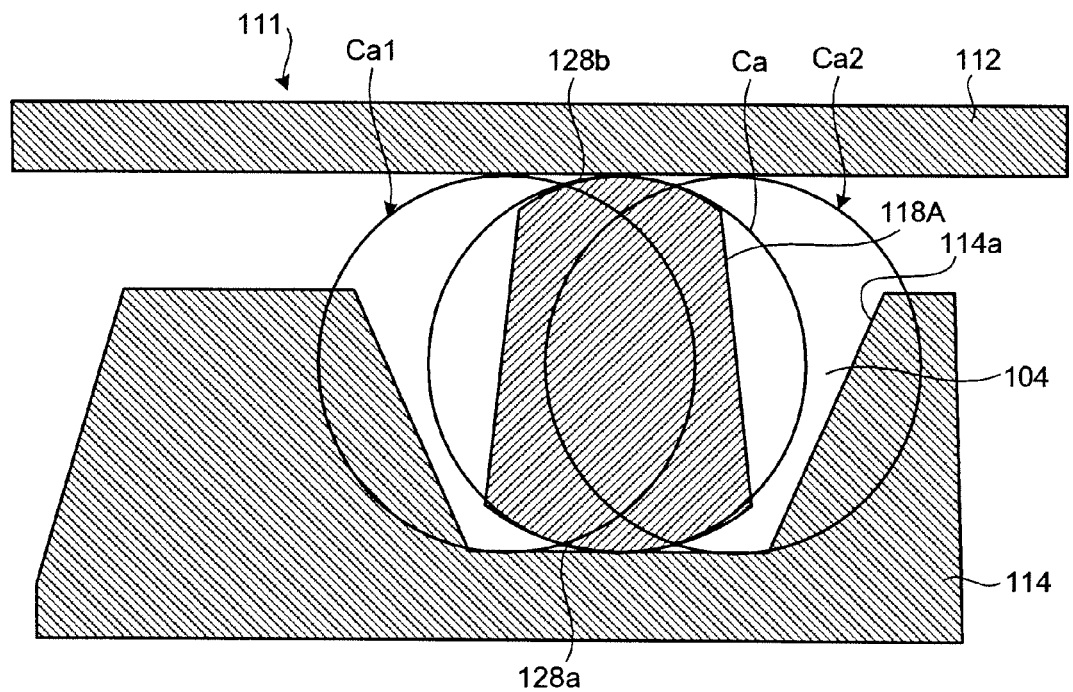
FIG. 14 is a side view of the parallel moving device having another pin-shaped member.

FIG. 10 is a perspective view for explaining another pin-shaped member in the parallel moving device. FIG. 11 is a side view for explaining another pin-shaped member in the parallel moving device. FIG. 12 is a schematic for explaining an operation of another pin-shaped member in the parallel moving device. FIGS. 13 and 14 are side views of the parallel moving device having another pin shaped body.

As shown in FIGS. 10 to 12, a pin-shaped member 118A having a shape different from that of the pin-shaped member 118 has a stepless structure including the tapered surface 118*a* (not shown) on the side surface of the main body. However, the pin-shaped member 118A includes the curved surface 128*a* at one end and a curved surface 128*b* at the other end like the pin-shaped member 118. The curved surface 128*a* has a shape obtained by cutting out a part of a spherical body C1 having a radius R1 with a point P determined as a central point, and the curved surface 128*b* has a shape obtained by cutting out a part of a spherical body C2 having a radius R2 with the point P determined as the central point.

As shown in FIG. 12, even if this pin-shaped member 118A tilts in any direction substantially perpendicular to the optical axis LA (not shown) like the pin-shaped member 118, a position of the central point P between the curved surface 128*a* and the curved surface 128*b* and a height in the PE direction running through the central point P do not vary. Therefore, as shown in FIG. 13, the parallel moving device 11 including this pin-shaped member 118A can support the moving frame 114 to allow its parallel movement without changing a gap between the fixed plate 112 and the moving frame 114.

It is to be noted that the tilt range of the pin-shaped member 118A is determined in a range where the lateral outer peripheral surface of the pin-shaped member 118A comes into contact the inner wall 114*a* in the concave portion 104 of the moving frame 11*a* as shown in FIG. 13. Therefore, as shown in FIG. 14, according to the parallel moving device 111 having this pin-shaped member 118A, a volume occupied in arrangement and a mass can be reduced as compared with an example where a spherical body Ca having an external diameter running through the contact point between the concave portion 104 of the moving frame 114 and the curved surface 128*a* and the contact point between the fixed plate 112 and the curved surface 128*b* is adopted as a support member.

Furthermore, according to this parallel moving device 111, when a movement range of the moving frame 114 based on the pin-shaped member 118A is equivalent to that based on the spherical body Ca, an occupied range concerning a movement can be also reduced as compared with an example where the spherical body Ca rolls in a range of Ca1 and Ca2 to move the moving frame 114.

Figure 15:
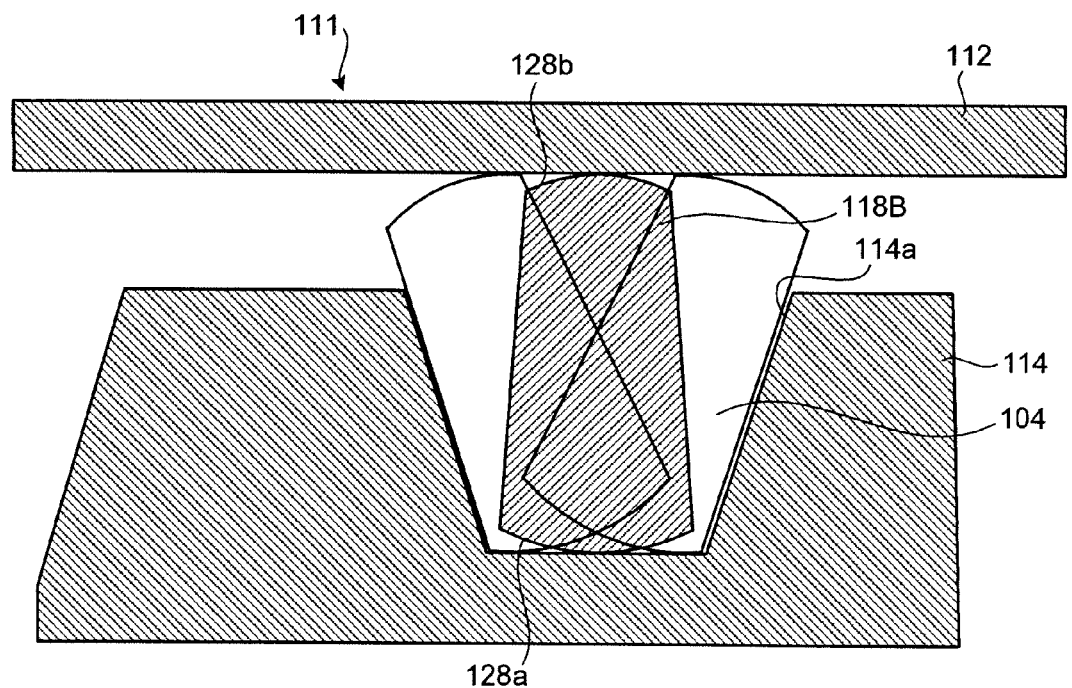
FIG. 15 is a side view of still another pin-shaped member in the parallel moving device.
Figure 16:
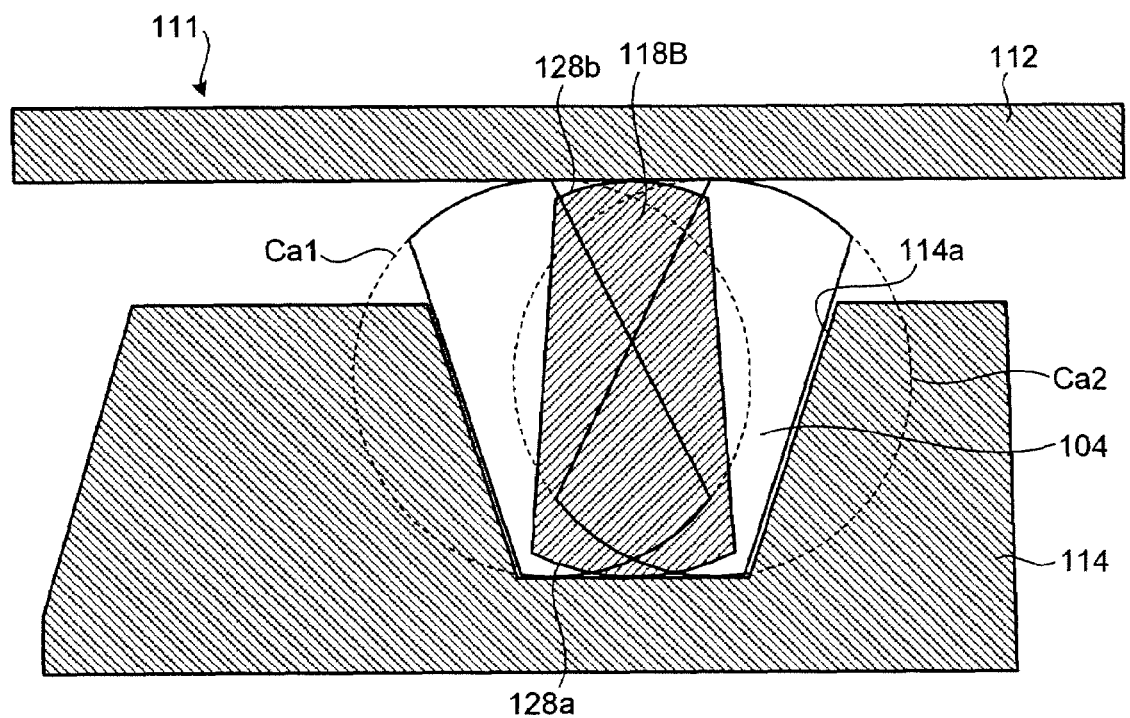
FIG. 16 is a side view of still another pin-shaped member in the parallel moving device.

FIGS. 15 and 16 are side views for explaining still another pin-shaped member in the parallel moving device. As shown in FIG. 15, the parallel moving device 111 has a pin-shaped member 118B including curved surfaces 128*a* and 128*b* that respectively come into contact the moving frame 114 and the fixed plate 112 like the pin-shaped member 118A. This pin-shaped member 118B has a shape with a lateral outer peripheral length (a peripheral length in a direction substantially perpendicular to the optical axis LA (not shown)) smaller than that of the pin-shaped member 118A. The parallel moving device 111 has a structure in which a shape of the inner wall 114*a* in the concave portion 104 of the moving frame 114 is modified according to this reduced shape.

As a result, the tilt range of the pin-shaped member 118B and the movement range of the moving frame 114 involved by this tilt range become smaller than those in case of the pin-shaped member 118A. However, as shown in FIG. 16, the occupied range concerning movement can be reduced like the foregoing as compared with the example where the spherical body Ca (not shown) rolls in the range of Ca1 and Ca2 to move the moving frame 114. Therefore, according to the parallel moving device 111 having such a configuration, the entire apparatus can be reduced in size with the simplified structure.

Again referring to FIGS. 2 to 5, the fixed plate 112 in the parallel moving device 111 is formed of, e.g., a donut-like discoid member having a space at the center, and has a structure in which the three driving coils 150*a* to 150*c* are arranged on one plate surface. Each of these three driving coils 150*a* to 150*c* is arranged on the fixed plate 112 in such a manner that the center thereof is arranged on a circumference having the optical axis LA of the lens unit 120 as the center.

In this first embodiment, for example, the driving coil 150*a* is arranged at an upper position vertical to the optical axis LA of the lens unit 120 (on a Y axis in FIG. 2), the driving coil 150*b* is arranged at a position horizontal to the optical axis LA (on an X axis in FIG. 2), and the driving coil 150*c* is arranged at a position perpendicular to the optical axis LA apart from each of the driving coil 150*a* and the driving coil 150*b* at a central angle 135° (on a V axis in FIG. 2).

Therefore, the driving coil 150*a* is apart from the driving coil 150*b* at a central angle 90°, the driving coil 150*b* is apart from the driving coil 150*c* at the central angle 135°, and the driving coil 150*c* is apart from the driving coil 150*a* at the central angle 135°. Each of the driving coils 150*a* to 150*c* is wound in a rectangular shape in a state where each winding has a rounded corner, and arranged on the fixed plate 112 in such a manner that a central line of this rectangular shape matches with a radial direction of the circumference.

On the other hand, like the fixed plate 112, the moving frame 114 in the parallel moving device 111 is formed of, e.g., a donut-like discoid member having a space at the center, and arranged to be superimposed on the fixed plate 112 in parallel. The image stabilizing lens 116 is disposed in the opening at the center of the moving frame 114. Driving magnets 152 having, e.g., a rectangular shape are respectively embedded in positions corresponding to the driving coils 150*a* to 150*c* on the circumference of the moving frame 114.

It is to be noted that the positions corresponding to the driving coils 150*a* to 150*c* mean positions that are substantially affected by magnetic fields formed by the driving coils 150*a* to 150*c*. Furthermore, the rectangular back yokes 158 are respectively disposed on the rear sides of the driving magnets 152, i.e., the opposite sides of the driving coils 150*a* to 150*c* to efficiently direct magnetic fluxes from the driving magnets 152 toward the fixed plate 112.

The rectangular attracting yokes 156 are disposed on the rear sides of the respective driving coils 150*a* to 150*c* of the fixed plate 112, i.e., the opposite side of the moving frame 114. Magnetic forces from the respective driving magnets 152 acting on the attracting yokes 156 respectively disposed at positions corresponding to these magnets allow the moving frame 114 to be attracted to the fixed plate 112. According to this first embodiment, the fixed plate 112 or the moving frame 114 is formed of, e.g., a resin molded member constituted of a nonmagnetic material so that a line of a magnetic force from each driving magnet 152 can efficiently reach each attracting yoke 156.

Figure 17A:
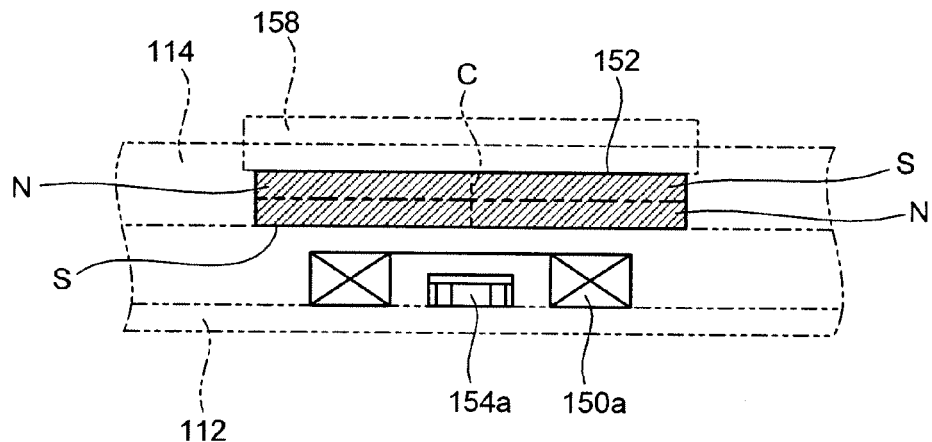
FIG. 17A is a partially enlarged side view of an actuator for explaining a positional relationship among a driving coil, a driving magnet, a back yoke, and an attracting yoke.
Figure 17B:
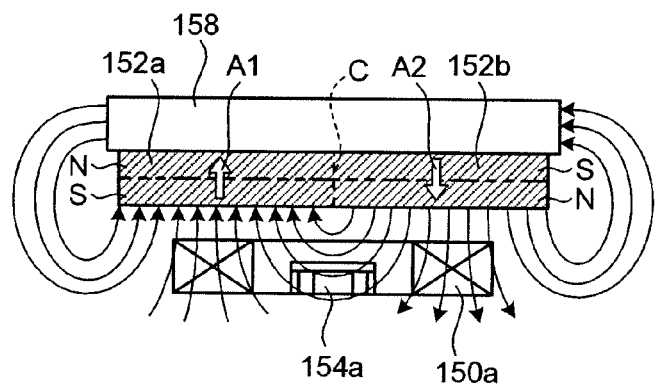
FIG. 17B is an explanatory view of a magnetizing direction and a magnetic flux distribution in the driving coil and the driving magnet.
Figure 17C:
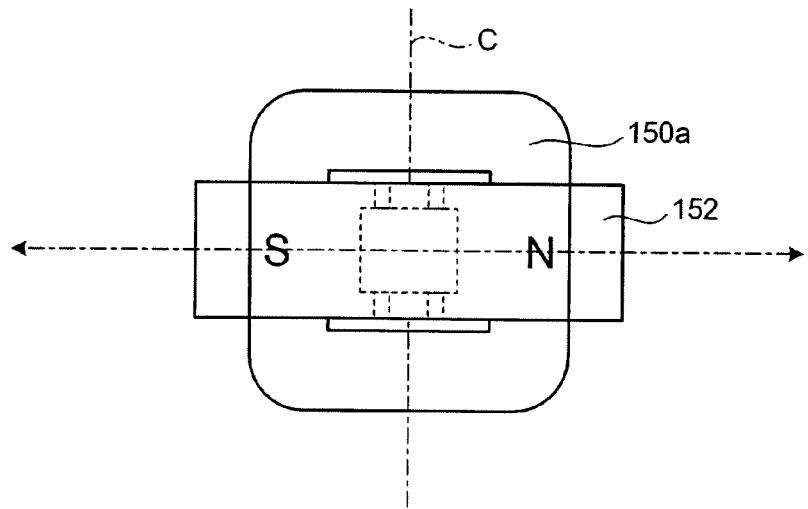
FIG. 17C is a partially enlarged front view of the actuator for explaining a positional relationship between the driving coil and the driving magnet.

FIG. 17A is a partially enlarged side view of the actuator for explaining a positional relationship among the driving coil, the driving magnet, the back yoke and the attracting yoke. FIG. 17B is an explanatory view of a magnetizing direction and a magnetic flux distribution in the driving coil and the driving magnet. FIG. 17C is a partially enlarged front view of the actuator for explaining a positional relationship between the driving coil and the driving magnet. As shown in FIGS. 2 and 17A to 17C, the driving magnet 152, the back yoke 158, and the attracting yoke 156 each having a rectangular shape are arranged in such a manner that each wide side and each narrow side overlap each other.

The driving coil 150a is arranged in such a manner that each side in its rectangular shape becomes parallel with each wide side and each narrow side of the rectangular back yoke 158. Moreover, a magnetizing boundary C of the driving magnet 152 is directed to match with a radial direction of the circumference having each driving magnet 152 arranged thereon.

As a result, when a current flows through the corresponding driving coil 150a, the driving magnet 152 receives a driving force in a tangential direction of the circumference. In regard to the other driving coils 150b and 150c, the corresponding driving magnet 152, back yoke 158, and attracting yoke 156 are respectively arranged in the same positional relationship.

It is to be noted that the magnetizing boundary C means a line representing a boundary between two regions when the two regions of the driving magnet 152 are magnetized in different directions, for example. According to this first embodiment, the magnetizing boundary C is positioned near a middle point between magnetized regions 152a and 152b of the rectangular driving magnet 152, for example.

As shown in FIGS. 17A and 17B, the driving magnet 152 is magnetized in such a manner that a magnetic flux faces a direction vertical to a plane facing the driving coil 150a. For example, the driving magnet 152 is magnetized in such a manner that a lower left part has an S pole, a lower right part has an N pole, an upper left part has the N pole, and an upper right part has an S pole with the magnetizing boundary C at the center, thereby forming the magnetized regions 152a and 152b (see FIG. 17B).

Therefore, the line of the magnetic force from the driving magnet 152 can be represented as shown in FIG. 17B, and a direction A1 of a magnetic flux in the left magnetized region 152a with the magnetizing boundary C at the center is depicted as facing a direction of the back yoke 158 as indicated by an outline arrow in the drawing. A direction A2 of a magnetic flux in the right magnetized region 152b with the magnetizing boundary C at the center is depicted as facing a direction of the driving coil 150a as indicated by an outline arrow in the drawing.

As shown in FIGS. 2 to 5 and FIGS. 17A to 17C, the magnetic sensors 154a, 154b, and 154c are respectively arranged in inner voids of the driving coils 150a to 150c. When the moving frame 114 is placed at a neutral position with respect to the fixed plate 112, each of the magnetic sensors 154a to 154c is arranged in such a manner that a later-described sensitivity central point S thereof (not shown) is placed on the magnetizing boundary C of each driving magnet 152. It is to be noted that a hall element or the like is used as each of the magnetic sensors 154a to 154c in this first embodiment.

Figure 18A:
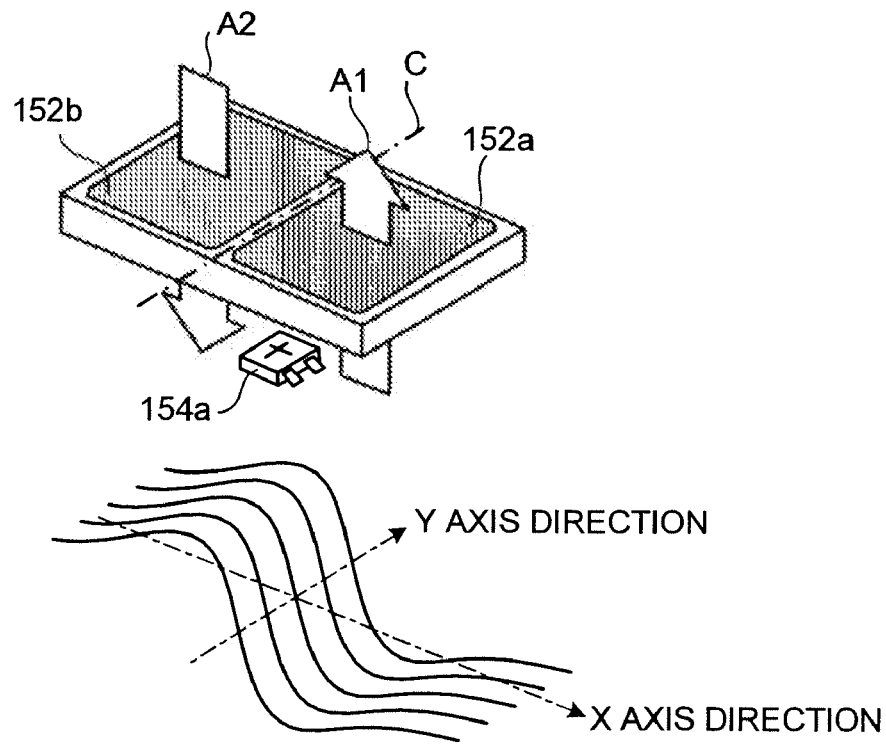
FIG. 18A is an explanatory diagram for explaining a relationship between movement of the driving magnet and a signal output from a magnetic sensor.
Figure 18B:
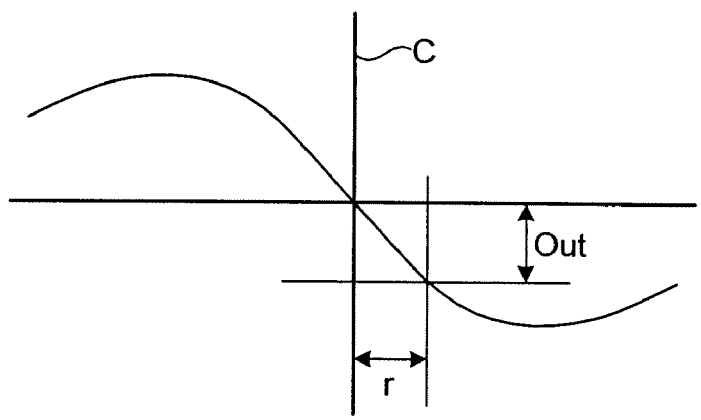
FIG. 18B is an explanatory diagram for explaining the relationship between movement of the driving magnet and the signal output from the magnetic sensor.

FIGS. 18A, 18B, and 19A to 19B are explanatory views for explaining a relationship between movement of each driving magnet and a signal output from each magnetic sensor. As shown in FIGS. 18A and 18B, when the sensitivity central point S of the magnetic sensor 154a is positioned on the magnetizing boundary C of the driving magnet 152, an output from the magnetic sensor 154a is zero.

When the driving magnet 152 moves together with the moving frame 114 and the sensitivity central point S of the magnetic sensor 154a deviates from the magnetizing boundary C of the driving magnet 152 to move to the N pole side or the S pole side, an output signal Out (see FIG. 18B) from the magnetic sensor 154a changes to a positive signal or a negative signal.

For example, when the driving magnet 152 moves in a direction perpendicular to the magnetizing boundary C, i.e., a direction of the X axis in FIG. 18A, the magnetic sensor 154a generates an output signal Out whose waveform changes to such a sine wave as shown in FIG. 18B. Therefore, when an amount of movement of the driving magnet 152 is small, the magnetic sensor 154a outputs the output signal Out substantially proportional to a distance r from the sensitivity central point S to the magnetizing boundary C of the driving magnet 152.

In this first embodiment, when a moving distance of the driving magnet 152 is, e.g., within approximately 3% of a length of the driving magnet 152 in a distance detecting direction, the output signal Out output from the magnetic sensor 154a is substantially proportional to the distance between the sensitivity central point S of the magnetic sensor 154a and the magnetizing boundary C of the driving magnet 152. According to this first embodiment, the actuator 110 operates in a range where an output from each of the magnetic sensors 154a to 154c is substantially proportional to the distance r.

Figure 19A:
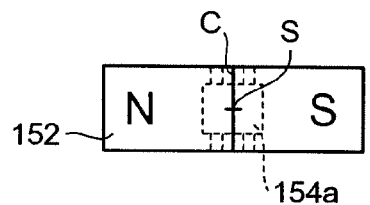
FIG. 19A is an explanatory diagram for explaining a relationship between movement of the driving magnet and the signal output from the magnetic sensor.
Figure 19B:
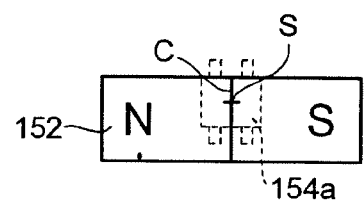
FIG. 19B is an explanatory diagram for explaining a relationship between movement of the driving magnet and the signal output from the magnetic sensor.

Therefore, when the magnetizing boundary C of the driving magnet 152 is positioned on the sensitivity central point S of the magnetic sensor 154a as shown in FIGS. 19A and 19B, or when the driving magnet 152 moves toward the magnetizing boundary C as shown in, e.g., FIG. 19B, the output signal Out from the magnetic sensor 154a becomes zero.

Figure 19C:
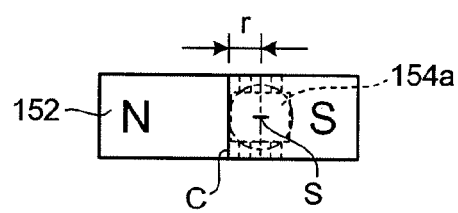
FIG. 19C is an explanatory diagram for explaining a relationship between movement of the driving magnet and the signal output from the magnetic sensor.
Figure 19D:
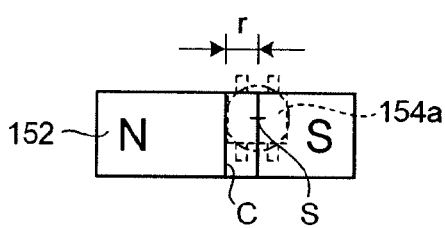
FIG. 19D is an explanatory diagram for explaining a relationship between movement of the driving magnet and the signal output from the magnetic sensor.

Additionally, when the magnetizing boundary C of the driving magnet 152 deviates from the sensitivity central point S of the magnetic sensor 154 as shown in FIG. 19C, the magnetic sensor 154a outputs the positive or negative output signal Out proportional to the distance r between the sensitivity central point S and the magnetizing boundary C.

Therefore, if the distance r between the sensitivity central point S and the magnetizing boundary C remains the same, the magnetic sensor 154a outputs the positive or negative output signal Out having the same intensity both when the driving magnet 152 moves in a direction perpendicular to the magnetizing boundary C as shown in, e.g., FIG. 19C and when the driving magnet 152 performs movement in an arbitrary direction as shown in FIG. 19B.

It is to be noted that the magnetic sensor 154a is explained in this example, but the other magnetic sensors 154b and 154c likewise output the same output signal Out based on a positional relationship with respect to the driving magnets 152 corresponding to these sensors. Therefore, a position of parallel movement or rotational movement carried out by the moving frame 114 with respect to the fixed plate 112 can be specified based on a signal detected by each of the magnetic sensors 154a to 154c.

As shown in FIG. 2, the three pin-shaped members 118 are respectively arranged on an circumference between the fixed plate 112 and the moving frame 114 outside the circumference having the respective driving coils 150a to 150c of the fixed plate 112 arranged thereon in a state where axes thereof are parallel to the direction of the optical axis LA. These three pin-shaped members 118 are arranged at intervals of, e.g., a central angle 120°, and one of them is arranged to be placed between the driving coil 150a and the driving coil 150b.

As shown in FIGS. 3 to 5, each pin-shaped member 118 is arranged between the fixed plate 112 and the moving frame 114 in a state where its curved surfaces at both ends in the axial direction are respectively in contact with the fixed plate 112 and the moving frame 114. As a result, the moving frame 114 is supported on a plane parallel to the fixed plate 112, and each pin-shaped member 118 tilts between the moving frame 114 and the fixed plate 112 in response to movement of the moving frame 114, thereby allowing a parallel movement or a rotational movement of the moving frame 114 in an arbitrary direction with respect to the fixed plate 112.

A predetermined gap is formed between the fixed plate 112 and the moving frame 114 while these members are supported by each pin-shaped member 118. Therefore, when the moving frame 114 moves with respect to the fixed plate 112, resistance and others do not occur between these member due to contact, and a parallel movement or a rotational movement can be smoothly carried out.

It is to be noted that the pin-shaped member 118 in this first embodiment 1 is formed of a pin-shaped resin molded member having a predetermined degree of hardness or self-lubricating properties. Besides, the pin-shaped member 118 may be formed of, e.g., a metal material. The cross section of the pin-shaped member 118 in a direction substantially perpendicular to the axial direction does not have to be necessary a circular shape as explained above. The pin-shaped member 118 may have any other cross sections, e.g., a rectangular cross section.

Further, each of the curved surfaces of the pin-shaped member 118 at both ends in the axial direction is not restricted to a shape curved outwards in the axial direction, and it may be formed to be curved inwards in the axial direction. In this case, a contact part of each of the fixed plate 112 and the moving frame 114 that comes into contact with each curved surface may have a shape that keeps a fixed gap (prevents a change from occurring in a gap) between itself and each of the fixed plate 112 and the moving frame 114.

Figure 20:
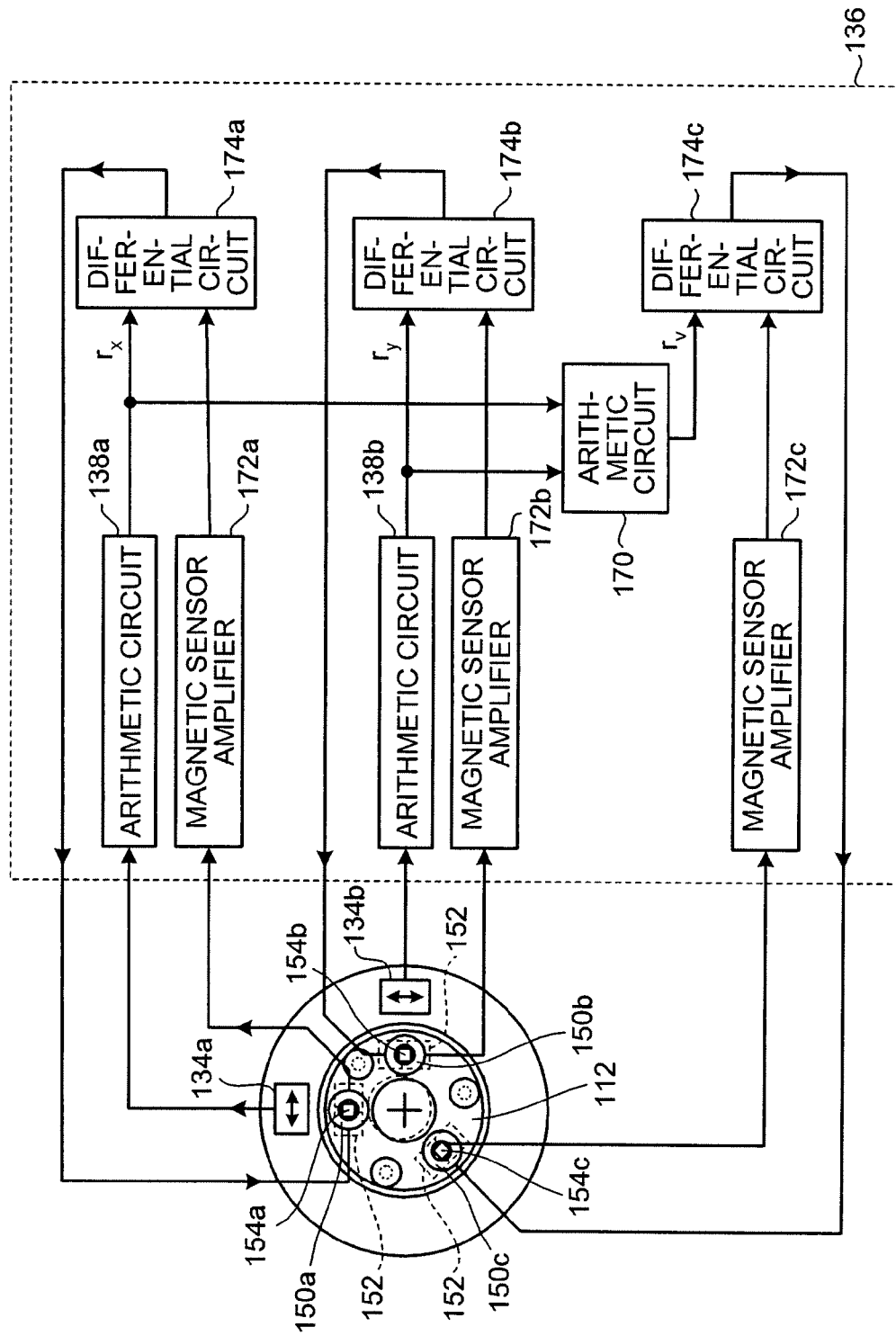
FIG. 20 is a block diagram for explaining a signal processing in a controller provided in a lens unit of the camera according to the first embodiment.

Control by the actuator 110 included in the camera 100 according to this first embodiment will now be explained with reference to FIG. 20. FIG. 20 is a block diagram of a path of signal processing in a controller included in the lens unit of the camera. As shown in FIG. 20, the two gyros 134a and 134b detect a vibration of the lens unit 120 (see FIG. 1) from time to time, and detection signals from these gyros 134a and 134b are respectively input to arithmetic circuits 138a and 138b as lens position command signal generating units included in the controller 136.

It is to be noted that, in the first embodiment, the gyro 134a is configured to detect an angular velocity of a yawing motion performed by the lens unit 120 and the gyro 134b is configured to detect an angular velocity of a pitching motion carried out by the lens unit 120, and these gyros are arranged in the lens unit 120.

The arithmetic circuits 138a and 138b in the controller 136 produce a lens position command signal that indicates a position to which the image stabilizing lens 116 (see FIG. 1) disposed on the moving frame 114 should be moved in time series based on detection signals of angular velocities input from the gyros 134a and 134b from time to time.

That is, the arithmetic circuit 138a performs time integration with respect to the angular velocity of the yawing motion detected by the gyro 134a, and adds a predetermined correction signal to the integration result to generate a horizontal component of a lens position command signal. Likewise, the arithmetic circuit 138b is configured to produce a vertical component of the lens position command signal based on the angular velocity of the pitching motion detected by the gyro 134b.

Moving the image stabilizing lens 116 together with the moving frame 114 from time to time based on the thus obtained lens position command signal can stabilize an image focused on the film plane F in the camera main body 140 even if the lens unit 120 vibrates during, e.g., exposure for photography.

A coil position command signal generating unit included in the controller 136 is configured to generate coil position command signals for the respective driving coils 150a to 150c based on the lens position command signal produced by the arithmetic circuits 138a and 138b. The coil position command signal is a signal indicative of a positional relationship between each of the driving coils 150a to 150c and each corresponding driving magnet 152 when the image stabilizing lens 116 is moved together with the moving frame 114 to a position specified by the lens position command signal.

That is, when the driving magnets 152 arranged at the positions corresponding to the driving coils 150a to 150c are moved to positions specified by the coil position command signals for the respective driving coils 150a to 150c, the image stabilizing lens 116 moves together with the moving frame 114 to a position specified by the lens position command signal.

According to this first embodiment, since the driving coil 150a is provided at an upper position vertical to the optical axis LA (see FIG. 1), the coil position command signal for the driving coil 150a becomes equal to the horizontal component of the lens position command signal output from the arithmetic circuit 138a. Since the driving coil 150b is provided at a horizontal (lateral) position with respect to the optical axis LA, the coil position command signal for the driving coil 150b becomes equal to the vertical component of the lens position command signal output from the arithmetic circuit 138b. An arithmetic circuit 170 as a coil position command signal generating unit generates the coil position command signal for the driving coil 150c based on the horizontal component and the vertical component of the lens position command signal.

On the other hand, a magnetic sensor amplifier 172a amplifies an amount of movement of the driving magnet 152 with respect to the driving coil 150a measured by the magnetic sensor 154 at a predetermined magnification. A differential circuit 174a outputs to the driving coil 150a a current corresponding to a difference between the horizontal component of the coil position command signal output from the arithmetic circuit 138a and the amount of movement of the driving magnet 152 with respect to the driving coil 150a output from the magnetic sensor amplifier 172a.

Therefore, when the coil position command signal from the arithmetic circuit 138a and the output from the magnetic sensor amplifier 172a have no difference, the differential circuit 174a does not output a current to the driving coil 150a, whereby a driving force acting on the driving magnet 152 at a position corresponding to the driving coil 150a becomes zero.

Likewise, a magnetic sensor amplifier 172b amplifies an amount of movement of the driving magnet 152 with respect to the driving coil 150b measured by the magnetic sensor 154b at a predetermined magnification. A differential circuit 174b outputs to the driving coil 150b a current corresponding to a difference between the vertical component of the coil position command signal output from the arithmetic circuit 138b and the amount of movement of the driving magnet 152 with respect to the driving coil 150b output from the magnetic sensor amplifier 172b.

Therefore, when the coil position command signal from the arithmetic circuit 138b and the output from the magnetic sensor amplifier 172b have no difference, the differential circuit 174b does not output a current to the driving coil 150b, whereby a driving force acting on the driving magnet 152 at a position corresponding to the driving coil 150b becomes zero.

A magnetic sensor amplifier 172c amplifies an amount of movement of the driving magnet 152 with respect to the driving coil 150c measured by the magnetic sensor 154c at a predetermined magnification. A differential circuit 174c outputs to the driving coil 150c a current corresponding to a difference between the coil position command signal output from the arithmetic circuit 170 and the amount of movement of the driving magnet 152 with respect to the driving coil 150c output from the magnetic sensor amplifier 172c.

Therefore, when the coil position command signal from the arithmetic circuit 170 and the output from the magnetic sensor amplifier 172c have no difference, the differential circuit 174c does not output a current to the driving coil 150c, whereby a driving force acting on the driving magnet 152 at a position corresponding to the driving coil 150c becomes zero. Performing feedback control over each of the driving coils 150a to 150c based on the lens position command signal and the coil position command signal in this manner allows correcting a position of the image stabilizing lens 116.

Figure 21:
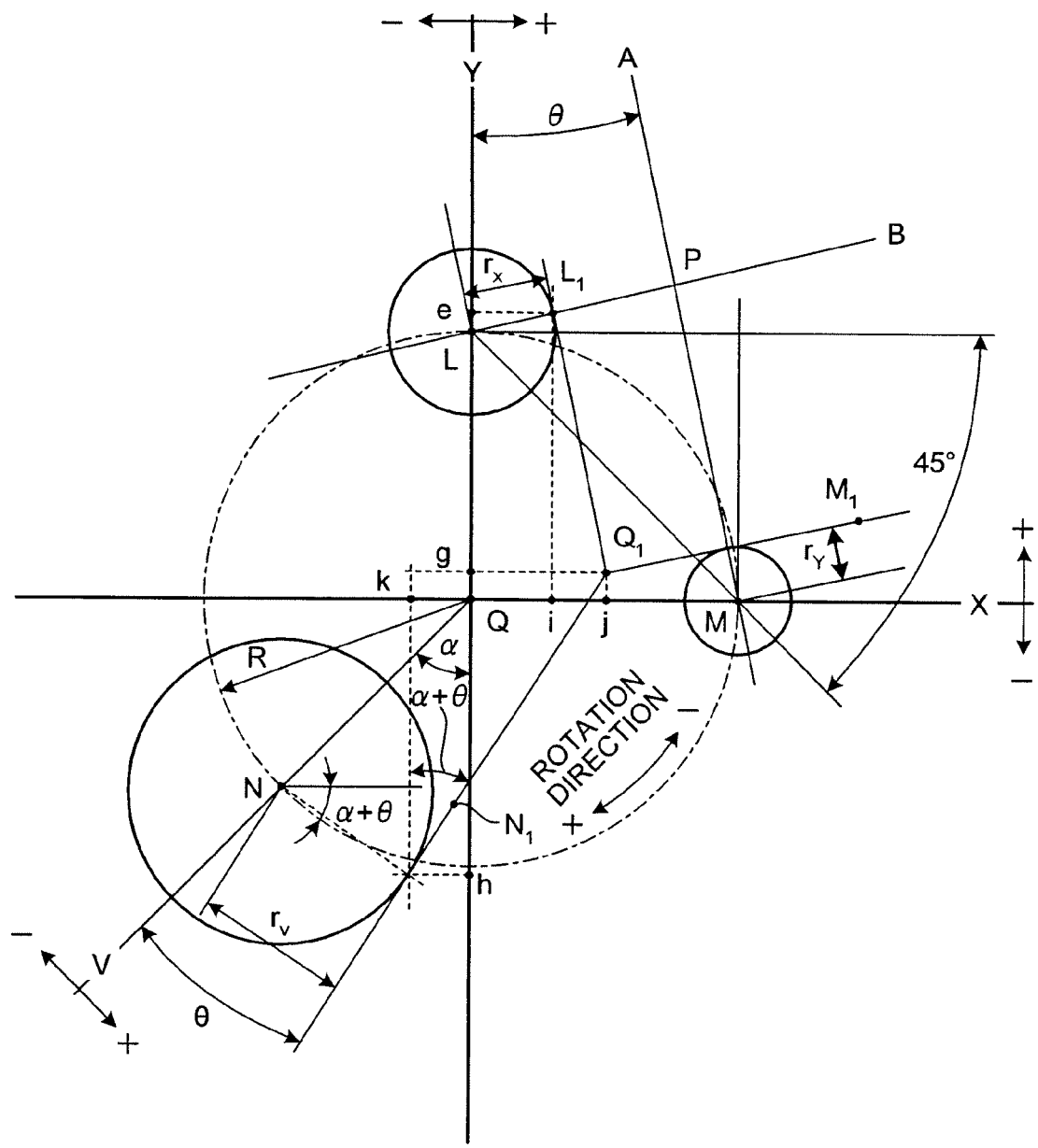
FIG. 21 is an explanatory diagram showing a positional relation between three driving coils arranged on a fixed plate and three driving magnets arranged on a moving frame.

A relationship between the lens position command signal and the coil position command signal when translating the moving frame 114 will now be explained with reference to FIG. 21. FIG. 21 is an explanatory view of a positional relationship between the three driving coils arranged on the fixed plate and the three driving magnets arranged on the moving frame.

Respective central points of the three driving coils 150a to 150c (not shown in FIG. 21 hereinafter) are arranged on points L, M, and N on a circumference having a radius R with a point Q being determined as an origin. Respective sensitivity central points S of the magnetic sensors 154a to 154c (not shown in FIG. 21 hereinafter) are likewise positioned on the points L, M, and N.

When the moving frame 114 is placed at a neutral position, i.e., when the center of the image stabilizing lens 116 disposed to the moving frame 114 is positioned on the optical axis LA (see FIG. 1), middle points of the magnetizing boundaries C of the respective driving magnets 152 corresponding to the driving coils 150a to 150c are also positioned on the points L, M, and N.

Assuming that a horizontal axis line having the point Q in FIG. 21 as an origin is an X axis, a vertical axis line is a Y axis, and an axis forming an angle of 135° with respect to each of the X axis and the Y axis is a V axis, the magnetizing boundaries C of the respective driving magnets 152 are placed at positions overlapping the X axis, the Y axis, and the V axis.

When the moving frame 114 moves, the central point of the image stabilizing lens 116 shifts to a point $Q_1$ and the moving frame 114 further rotates around the point $Q_1$ at an angle θ in a counterclockwise direction, the middle points of the magnetizing boundaries C of the respective driving magnets 152 move to points $L_1$, $M_1$, and $N_1$.

An intensity of the coil position command signal for the driving coil 150a must have a value proportional to a radius of a circle that is in contact with a straight line $Q_1L_1$ with the point L at the center, an intensity of the coil position command signal for the driving coil 150b must have a value proportional to a radius of a circle that is in contact a straight line $Q_1M_1$ with the point M at the center, and an intensity of the coil position command signal for the driving coil 150c must have a value proportional to a radius of a circle that is in contact with a straight line $Q_1N_1$ with the point N at the center to allow the moving frame 114 to move to such a position.

The radii of these circles are determined as $r_x$, $r_y$, and $r_v$, and signs of the respective coil position command signals $r_x$, $r_y$, and $r_v$ are determined as shown in FIG. 21. That is, the coil position command signal $r_x$ that is used to move the point $L_1$ to a first quadrant is determined as positive, and the coil position command signal $r_x$ that is used to move the same to a second quadrant is determined as negative. Likewise, the coil position command signal $r_y$ that is used to move the point $M_1$ to the first quadrant is determined as positive, and the coil position command signal $r_y$ that is used to move the same to a fourth quadrant is determined as negative.

Furthermore, the coil position command signal $r_v$ that is used to move the point $N_1$ to a lower side of the V axis is determined as positive, and the coil position command signal $r_v$ that is used to move the same to an upper side of the V axis is determined as negative. A sign of an angle in a clockwise direction is determined as positive. Therefore, when the moving frame 114 is rotated from the neutral position in the clockwise direction, the coil position command signal $r_x$ becomes positive, the coil position command signal $r_y$ becomes negative, and the coil position command signal $r_v$ becomes negative.

It is assumed that a coordinates of the point $Q_1$ is (j, g), coordinates of the point $L_1$ is (i, e), coordinates of the point $N_1$ is (k, h), and an angle formed between the V axis and the Y axis is α. An auxiliary line A running through the point M in parallel with the straight line $Q_1L_1$ and an auxiliary line B running through the point L in parallel with the straight line $Q_1M_1$ are drawn, and an intersecting point of the auxiliary line A and the auxiliary line B is determined as a point P.

Applying a sine theorem to a right-angle triangle LMP, the following expression can be obtained.

$$\frac{\overline{LP}}{\sin(45°+\theta)} = \frac{\overline{MP}}{\sin(45°-\theta)} = \frac{\sqrt{2}\,R}{\sin 90°} = \sqrt{2}\,R \qquad (1)$$

Therefore, a relationship represented by the following expressions can be achieved.

$$\overline{LP} = R(\cos\theta + \sin\theta) \qquad (2)$$

$$\overline{MP} = R(\cos\theta + \sin\theta) \qquad (3)$$

When the coordinates e, g, h, i, j, and k are represented in the form of R, $r_x$, $r_y$, $r_v$, θ, and α, the following expressions can be obtained based on a geometric relationship and the expression (3).

$$e = -r_X \sin\theta + R \qquad (4\text{-}1)$$

$$g = e - (\overline{MP} - r_Y)\cos\theta = -r_X \sin\theta + r_Y \cos\theta - R\cos\theta(\cos\theta - \sin\theta) + R \qquad (4\text{-}2)$$

$$h = -R\cos\alpha - r_Y \sin(\alpha+\theta) \qquad (4\text{-}3)$$

$$i = r_X \cos\theta \tag{4-4}$$

$$j = i - (\overline{MP} - r_Y)\sin\theta = r_X \cos\theta + r_Y \sin\theta - R\sin\theta(\cos\theta - \sin\theta) \tag{4-5}$$

$$k = -R\sin\alpha + r_V \cos(\alpha+\theta) \tag{4-6}$$

The following relationship can be attained in regard to a right-angle triangle having coordinates (k, g), (j, g), and (k, h) as apexes.

$$\frac{j-k}{g-h} = \tan(\alpha+\theta) \tag{5}$$

$$= \frac{\sin(\alpha+\theta)}{\cos(\alpha+\theta)}$$

$$= \frac{\sin\alpha\cos\theta + \cos\alpha\sin\theta}{\cos\alpha\cos\theta - \sin\alpha\sin\theta}$$

$$= \frac{r_X\cos\theta + r_Y\sin\theta - R\sin\theta(\cos\theta - \sin\theta) + R\sin\alpha - r_V\cos(\alpha+\theta)}{-r_X\sin\theta + r_Y\cos\theta - R\cos\theta(\cos\theta - \sin\theta) + R + R\cos\alpha + r_V\sin(\alpha+\theta)}$$

When the relationship represented by the expression (5) is developed and organized, a relationship represented by the following expression can be acquired.

$$r_X \cos\alpha - r_Y \sin\alpha - r_V = R(\sin\alpha + \cos\alpha)\sin\theta + R\sin\theta \tag{6}$$

When the moving frame 114 moves in parallel, θ=0 is achieved, and hence the expression (6) becomes as follows.

$$r_X \cos\alpha - r_Y \sin\alpha - r_V = 0 \tag{7}$$

According to this first embodiment, since α=45° is attained, the relationship represented by the expression (7) is simplified as follows.

$$r_V = \frac{(r_X - r_Y)}{\sqrt{2}} \tag{8}$$

Therefore, according to this first embodiment, when the lens position command signal is used to translate the center of the image stabilizing lens 116 to the coordinates (j, g), the coil position command signal $r_X$ proportional to a magnitude of the coordinate j is supplied to the driving coil 150a. The coil position command signal $r_Y$ proportional to a magnitude of the coordinate g is supplied to the driving coil 150b, and the expression (8) is used to calculate the coil signal directive signal $r_V$ that is supplied to the driving coil 150c.

It is to be noted that the coil position command signal $r_X$ corresponds to an output signal from the arithmetic circuit 138a shown in FIG. 20, and the coil position command signal $r_Y$ corresponds to an output signal from the arithmetic circuit 138b depicted in FIG. 20. The coil position command signal $r_V$ corresponds to an output signal from the arithmetic circuit 170 shown in FIG. 20 that performs a calculation equivalent to the expression (8).

The moving frame 114 and the image stabilizing lens 116 are uniquely positioned based on the respective coil position command signals $r_X$, $r_Y$, and $r_V$ obtained from the lens position command signal. Therefore, accidental rotation can be assuredly avoided even if a mechanism that restricts rotation around the optical axis LA is not provided.

Figure 22:
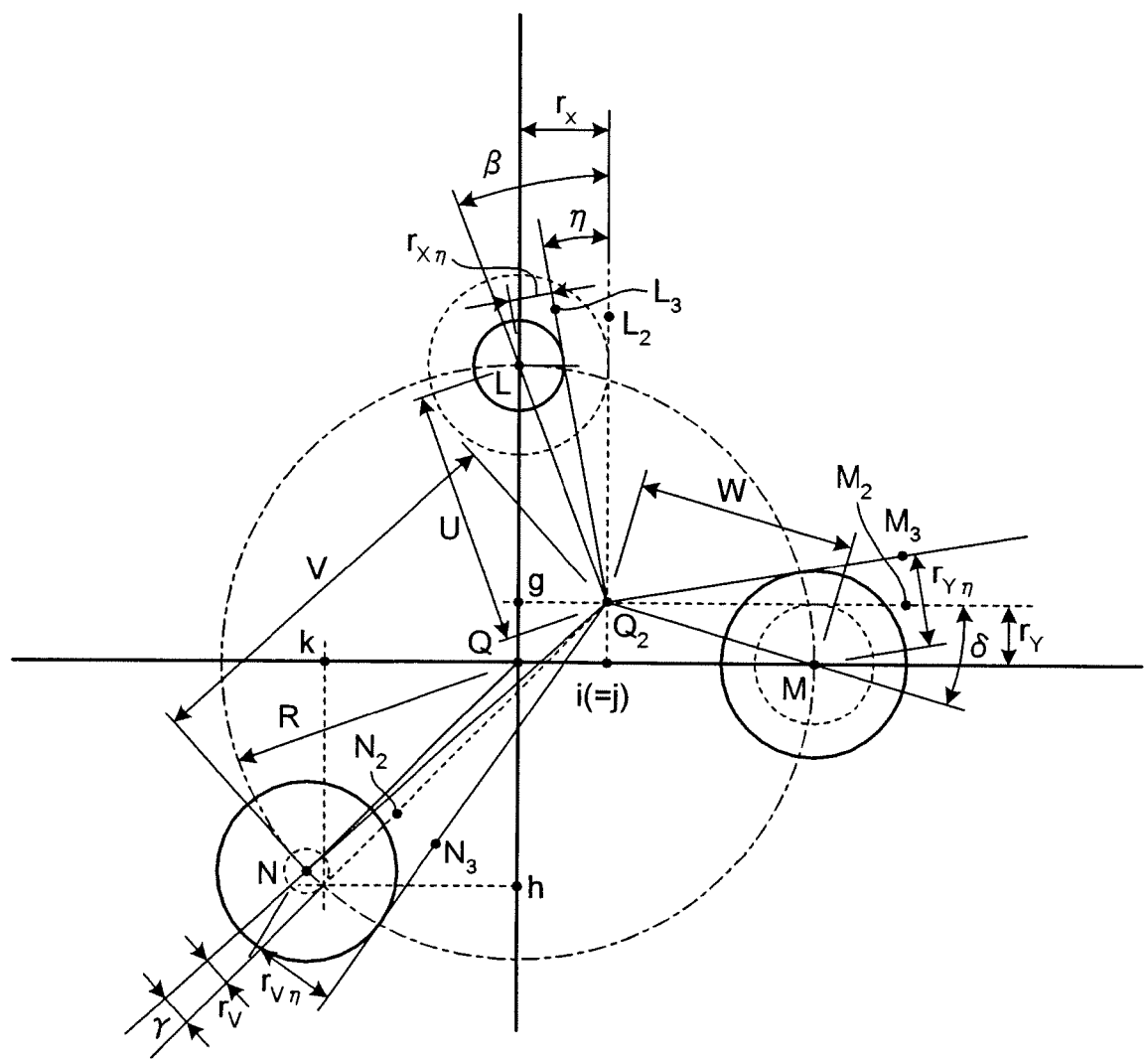
FIG. 22 is an explanatory diagram for explaining a coil position command signal when the moving frame is translated and rotated.

A relationship between the lens position command signal and the coil position command signals when rotating the moving frame 114 will now be explained with reference to FIG. 22. FIG. 22 is an explanatory view for explaining the coil position command signals when the moving frame carries out a parallel movement and a rotational motion. As shown in FIG. 22, when the moving frame 114 is translated, the center of the image stabilizing lens 116 disposed to this moving frame 114 moves from the point Q to a point $Q_2$. Then, the driving magnets 152 attached to the moving frame 114 respectively move from the points L, M, and N to points $L_2$, $M_2$, an $N_2$.

The coil position command signals corresponding to this parallel movement are assumed to be $r_X$, $r_Y$, and $r_V$. Intensities of these coil position command signals can be obtained based on, e.g., the expression (8). In this example, coil position command signals $r_{x\eta}$, $r_{y\eta}$, and $r_{v\eta}$ when the moving frame 114 is rotated around the point $Q_2$ at an angle η in a counterclockwise direction are calculated.

Similarly to the example depicted in FIG. 21, first, coordinates at the point $Q_2$ is determined as (j, g), and coordinates at a tangent point having a radius $r_V$ with a straight line $Q_2 N_2$ and the point N at the center is determined as (k, h). When 0 is assigned to θ in the expressions (4-1) to (4-6), the following relationship can be obtained.

$$g = r_Y \tag{9-1}$$

$$j = i = r_X \tag{9-2}$$

$$k = -R\sin\alpha + r_V \cos(\alpha+\theta) \tag{9-3}$$

$$= -R\frac{1}{\sqrt{2}} + r_V \frac{1}{\sqrt{2}}$$

Then, when the moving frame 114 is rotated around the point $Q_2$ at the angle η in the counterclockwise direction, the points $L_2$, $M_2$, and $N_2$ are respectively moved to points $L_3$, $M_3$, and $N_3$. An angle formed between a line segment $Q_2 L_2$ and a line segment $Q_2 L$ is determined as β; an angle formed between a line segment $Q_2 M_2$ and a line segment $Q_2 M$, δ; and an angle formed between a line segment $Q_2 N_2$ and a line segment $Q_2 N$, γ.

Additionally, a length of the line segment $Q_2 L$ is determined as U; a length of the line segment $Q_2 M$, W; and a length of the line segment $Q_2 N$, V. In this example, since intensities of the coil position command signals $r_{x\eta}$, $r_{y\eta}$, and $r_{v\eta}$ are respectively equal to radii of circles that are in contact with straight lines $Q_2 L_3$, $Q_2 M_3$, and $Q_2 N_3$ with the points L, M, and N at the centers, the following relationship can be achieved.

$$r_{x\eta} = U\sin(\beta+\eta) = U(\sin\beta\cos\eta + \cos\beta\sin\eta) \tag{10-1}$$

$$r_{v\eta} = -V\sin(\gamma+\eta) = -V(\sin\gamma\cos\eta + \cos\gamma\sin\eta) \tag{10-2}$$

$$r_{y\eta} = -W\sin(\delta+\eta) = -W(\sin\delta\cos\eta + \cos\delta\sin\eta) \tag{10-3}$$

Further, sin δ, cos δ and others can be expressed as follows based on the geometrical relationship.

$$\sin\beta = \frac{i}{U} = \frac{r_X}{U} \tag{11-1}$$

$$\cos\beta = \frac{R-g}{U} = \frac{R-r_Y}{U} \tag{11-2}$$

$$\sin\gamma = -\frac{r_V}{V} \tag{11-3}$$

-continued $$\cos\gamma = \frac{\sqrt{2}\,(i-k)}{V} = \frac{\sqrt{2}\,r_X + R - r_V}{V} \tag{11-4}$$

$$\sin\delta = \frac{g}{W} = \frac{-r_Y}{W} \tag{11-5}$$

$$\cos\delta = \frac{R-i}{W} = \frac{R-r_X}{W} \tag{11-6}$$

When the relationship represented by the expressions (11-1) to (11-6) is assigned to the expressions (10-1) to (10-3) and β, γ, and δ are erased, the following relationship can be obtained.

$$r_{X\eta} = r_X \cos\eta + (R - r_Y)\sin\eta \tag{12-1}$$

$$r_{V\eta} = r_V \cos\eta - (\sqrt{2}r_X + R - r_V)\sin\eta \tag{12-2}$$

$$r_{Y\eta} = r_Y \cos\eta - (R - r_X)\sin\eta \tag{12-3}$$

Therefore, the following operation can be performed to translate the center of the image stabilizing lens 116 to the coordinates (j, g) and move the moving frame 114 to a position obtained by rotating the image stabilizing lens 116 around the coordinates at the angle η in the counterclockwise direction.

That is, the expressions (8) and (9-1) to (9-3) are first used to calculate $r_X$, $r_Y$, and $r_V$, and the calculated values are then assigned in the expressions (12-1) to (12-3). The coil position command signals $r_{X\eta}$, $r_{Y\eta}$, and $r_{V\eta}$ are thereby calculated, and these results are supplied to the respective driving coils 150a to 150c to achieve the movement.

When the moving frame 114 is rotated around the point Q at the angle η in the counterclockwise direction without being translated, it is good enough to calculate the coil position command signals $r_{X\eta}$, $r_{Y\eta}$, and $r_{V\eta}$ based on the following expression having 0 assigned to $r_X$, $r_Y$, and $r_V$ in the expressions (12-1) to (12-3).

$$r_{X\eta} = R \sin\eta \tag{13-1}$$

$$r_{V\eta} = R \sin\eta \tag{13-2}$$

$$r_{Y\eta} = -R \sin\eta \tag{13-3}$$

Since the moving frame 114 and the image stabilizing lens 116 are uniquely positioned based on the respective coil position command signals $r_{X\eta}$, $r_{Y\eta}$, and $r_{V\eta}$ obtained from the lens position command signal in this manner, accidental rotation can be assuredly avoided even if a mechanism that restricts rotation around the optical axis LA is not provided.

Figure 23:
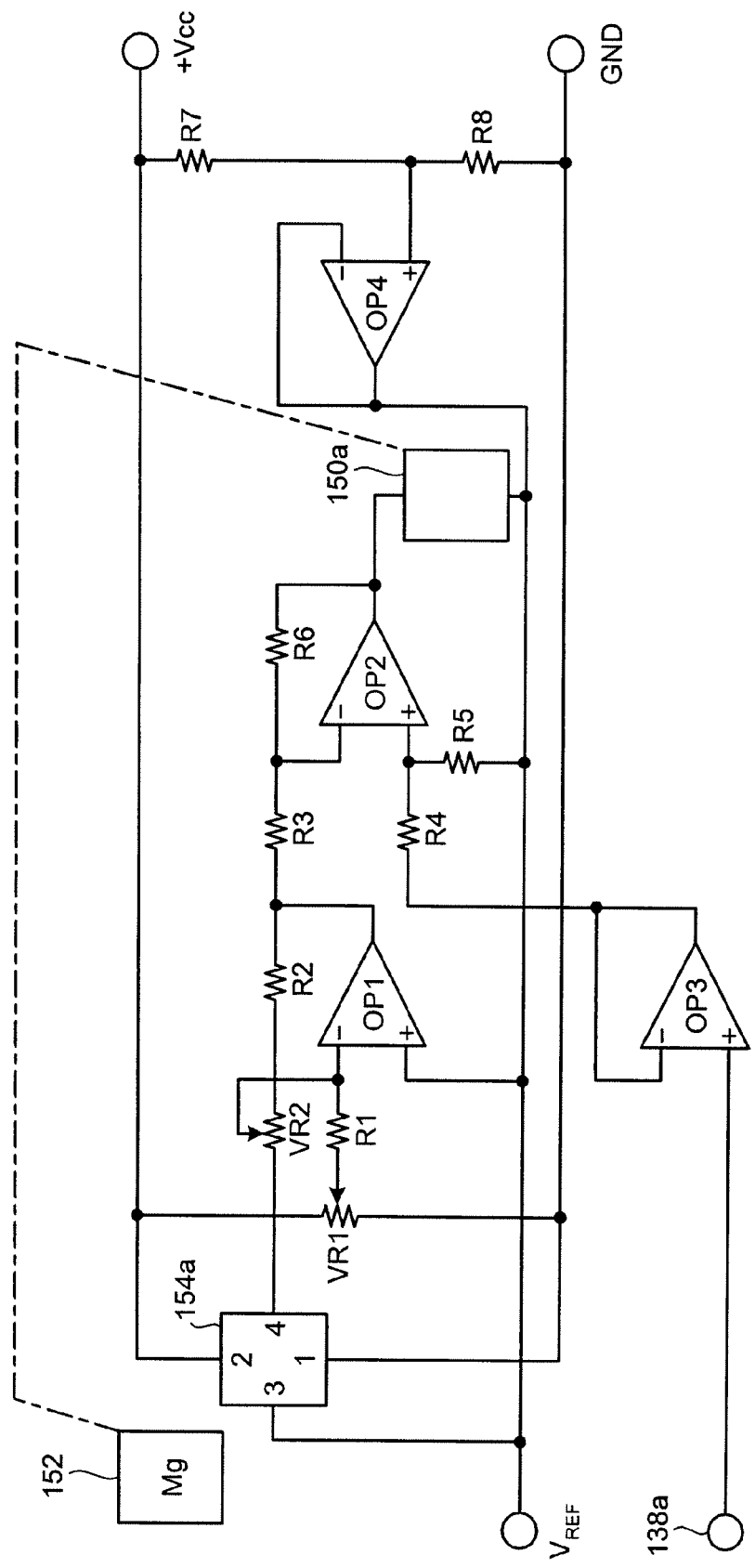
FIG. 23 is a circuit diagram of a circuit that controls a current output to the driving coil.

An example of a specific circuit of the controller 136 included in the lens unit 120 will now be explained with reference to FIG. 23. FIG. 23 is a circuit diagram of a circuit that controls a current output to each driving coil. It is to be noted that an associated circuit such as a power supply line that operates each operational amplifier is omitted in the circuit depicted in FIG. 23. As the magnetic sensor 154a, a sensor other than a hall element is used in this example.

First, as shown in FIG. 23, an electric resistor R7 and an electric resistor R8 are connected in series between a power supply voltage +Vcc and a ground potential GND. A positive-side input terminal of an operational amplifier OP4 is connected between the electric resistor R7 and the electric resistor R8. A negative-side input terminal of the operational amplifier OP4 is connected with an output terminal of the operational amplifier OP4. As a result, the electric resistor R7 and the electric resistor R8 set a voltage at the output terminal of the operational amplifier OP4 to a reference voltage $V_{REF}$ between the power supply voltage +Vcc and the ground potential GND, and maintain this voltage.

On the other hand, the power supply voltage +Vcc is applied between a first terminal and a second terminal of the magnetic sensor 154a. A third terminal of the magnetic sensor 154a is connected with the reference voltage $V_{REF}$. As a result, when a magnetic field acting on the magnetic sensor 154 varies, a voltage at a fourth terminal of the magnetic sensor 154a changes between the power supply voltage +Vcc and the ground potential GND.

The fourth terminal of the magnetic sensor 154a is connected with a negative-side input terminal of an operational amplifier OP1 through a variable resistor VR2, and adjusting the variable resistor VR2 can adjust a gain of an output from the magnetic sensor 154a. Fixed terminals of the variable resistor VR1 on both sides are connected with the power supply voltage +Vcc and the ground terminal GND, respectively. A movable-side terminal of the variable resistor VR1 is connected with the negative-side input terminal of the operational amplifier OP1 via an electric resistor R1.

Adjusting the variable resistor VR1 can adjust an offset voltage of an output from the operational amplifier OP1. A positive-side input terminal of the operational amplifier OP1 is connected with the reference voltage $V_{REF}$. An output terminal of the operational amplifier OP1 is connected with the negative-side input terminal of the operational amplifier OP1 via an electric resistor R2.

The arithmetic circuit 138a that outputs the coil position command signal for the driving coil 150a is connected with a positive-side input terminal of an operational amplifier OP3. An output terminal of the operational amplifier OP3 is connected with a negative-side input terminal of the operational amplifier OP3. Therefore, the operational amplifier OP3 functions as a buffer amplifier for the coil position command signal.

The output terminal of the operational amplifier OP1 is connected with a negative-side input terminal of an operational amplifier OP2. The output terminal of the operational amplifier OP3 is connected with a positive-side input terminal of the operational amplifier OP2. Therefore, the operational amplifier OP2 outputs from the output terminal thereof a difference between an output from the magnetic sensor 154a and the coil position command signal.

The positive-side input terminal of the operational amplifier OP2 is connected with the reference voltage $V_{REF}$ via an electric resistor R5, and the output terminal of the operational amplifier OP2 is connected with the negative-side input terminal of the operational amplifier OP2 through an electric resistor R6. These electric resistors R5 and R6 set gains on the negative side and the positive side.

The output terminal of the operational amplifier OP2 is connected with one end of the driving coil 150a, and the other end of the driving coil 150a is connected with the reference voltage $V_{REF}$. Therefore, a current corresponding to a potential difference between an output from the operational amplifier OP2 and the reference voltage $V_{REF}$ flows through the driving coil 150a. When the current flows through the driving coil 150a, a magnetic field is generated, and a magnetic force acts on the driving magnet 152 to move the driving magnet 152.

This magnetic force functions in a direction along which the driving magnet 152 moves closer to a position specified by the coil position command signal. When the driving magnet 152 is moved, a voltage output from the fourth terminal of the magnetic sensor 154a varies. When the driving magnet 152 moves to the position specified by the coil position command signal, a voltage input to the positive-side input terminal of the operational amplifier OP2 becomes equal to a voltage input to the negative-side input terminal of the same, whereby a current does not flow through the driving coil 150a.

It is to be noted that the operational amplifier OP1 depicted in FIG. 23 corresponds to the magnetic sensor amplifier 172a shown in FIG. 20 and the operational amplifier OP2 depicted in FIG. 23 corresponds to the differential circuit 174a shown in FIG. 20. Although the circuit that controls a current output to the driving coil 150a is explained in conjunction with FIG. 23, completely the same circuit can control a current output to the driving coil 150b.

The same circuit can also control a current output to the driving coil 150c, but an output from the arithmetic circuit 170 depicted in FIG. 20 is connected with the positive-side input terminal of the operational amplifier OP3 shown in FIG. 23 in this case. It is to be noted that the arithmetic circuit 170 can be formed of, e.g., the same differential circuit as the operational amplifier OP3 shown in FIG. 23, or an electric resistor that divides an output from this arithmetic circuit 170 by $(1/2)_{1/2}$.

An operation of the camera 100 according to the first embodiment of the present invention will now be described with reference to FIGS. 1 and 20. When an activation switch (not shown) having a hand movement preventing function for the camera 100 is first turned on, the actuator 110 included in the lens unit 120 is activated. The gyros 134a and 134b disposed to the lens unit 120 detect a vibration in a predetermined frequency band from time to time and output the detected vibration to the arithmetic circuits 138a and 138b included in the controller 136.

The gyro 134a outputs a signal indicative of an angular velocity of the lens unit in a yawing direction to the arithmetic circuit 138a, and the gyro 134b outputs a signal indicative of an angular velocity of the lens unit 120 in a pitching direction to the arithmetic circuit 138b. The arithmetic circuit 138a performs a single time integration of the input signal indicative of the angular velocity to calculate a yawing angle, and adds a predetermined correction signal to the calculated angle to generate a lens position command signal in the horizontal direction.

Likewise, the arithmetic circuit 138b performs a single time integration of the input signal indicative of the angular velocity to calculate a pitching angle, and adds a predetermined correction signal to the calculated angle to generate a lens position command signal in the vertical direction. Moving the image stabilizing lens 116 together with the moving frame 114 from time to time to a position specified by the lens position command signals output from the arithmetic circuits 138a and 138b in time series allows stabilizing an image focused on the film plane F of the camera main body 140.

It is to be noted that the lens position command signal in the horizontal direction output from the arithmetic circuit 138a is input to the differential circuit 174a as a coil position command signal $r_X$ for the driving coil 150a. Likewise, the lens position command signal in the vertical direction output from the arithmetic circuit 138b is input to the differential circuit 174b as a coil position command signal $r_Y$ for the driving coil 150b. Outputs from the arithmetic circuits 138a and 138b are input to the arithmetic circuit 170, and performing an arithmetic operation represented by the expression (8) produces a coil position command signal $r_V$ for the driving coil 150c.

On the other hand, the magnetic sensor 154a arranged in the inner void of the driving coil 150a outputs a detection signal to the magnetic sensor amplifier 172a, the magnetic sensor 154b arranged in the inner void of the driving coil 150b outputs a detection signal to the magnetic sensor amplifier 172b, and the magnetic sensor 154c arranged in the inner void of the driving coil 150c outputs a detection signal to the magnetic sensor amplifier 172c. The detection signals from the magnetic sensors 154a to 154c amplified in the magnetic sensor amplifiers 172a to 172c are input to the differential circuits 174a to 174c, respectively.

Each of the differential circuits 174a to 174c generates a voltage corresponding to a difference between the detection signal input to each of the magnetic sensors 154a to 154c and each of the coil position command signals $r_X$, $r_Y$, and $r_V$, and outputs a current proportional to this voltage to each of the driving coils 150a to 150c. When the current flows through each of the driving coils 150a to 150c, a magnetic field proportional to the current is produced.

Each driving magnet 152 arranged according to each of the driving coils 150a to 150c receives a driving force in a direction to move closer to a position specified by each of the coil position command signals $r_X$, $r_Y$, and $r_V$ based on this magnetic field. When each driving magnet 152 receives the driving force, each pin-shaped member 118 that supports the moving frame 114 and the fixed plate 112 in parallel tilts in response to movement of the moving frame 114 and smoothly translates or rotates the moving frame 114 having each driving magnet 152 disposed thereto on the same plane.

Since each pin-shaped member 118 tilts while maintaining a predetermined gap between the fixed plate 112 and the moving frame 114 at this moment, the fixed plate 112 does not come into contact with the moving frame 114, and resistance due to contact involved by the movement does not occur. Therefore, the moving frame 114 is smoothly moved with the small driving force.

When each driving magnet 152 reaches a position specified by the coil position command signal based on this driving force, the coil position command signal matches with the detection signal from each of the magnetic sensors 154a to 154c. Therefore, an output from each of the differential circuits 174a to 174c becomes zero, and the driving force also becomes zero. When each driving magnet 152 deviates from the position specified by the coil position command signal due to a disturbance or a change in coil position command signal, a current again flows through each of the driving coils 150a to 150c, and each driving magnet 152 returns to the position specified by the coil position command signal.

When such an operation is repeated from time to time, the image stabilizing lens 116 disposed to the moving frame 114 including each driving magnet 152 moves together with the moving frame to follow up the lens position command signal. As a result, an image focused on the film plane F in the camera main body 140 via the lens unit 120 is stabilized.

In the camera 100 according to the first embodiment, the moving frame 114 in the image stabilizing actuator 110 can be moved in an arbitrary direction without using guiding units arranged in two directions perpendicular to each other like a conventional example, thus realizing the actuator with a simple structure. Moreover, in the camera 100 according to the first embodiment of the present invention, the moving frame 114 in the image stabilizing actuator 110 can be translated or rotated in an arbitrary direction in a predetermined plane.

In the camera 100 according to the first embodiment, since the moving frame 114 in the parallel moving device 111 included in the actuator 110 is supported in parallel with respect to the fixed plate 112 by the pin-shaped members 118, resistance caused by being in contact with the fixed plate 112 does not occur practically when moving the moving frame 114, thereby smoothly moving the moving frame 114 with a small driving force.

Each pin-shaped member 118 is used as a support member, and the mechanism of the parallel moving device 111 is simplified. As a result, a weight of the moving frame 114 in the parallel moving device 111 can be reduced, and the moving frame 114 can be moved with a small driving force, thereby realizing the actuator 110 that can linearly respond at a high speed.

Although the first embodiment 1 according to the present invention has been explained above, it is needless to say that the first embodiment can be modified in many ways. For example, the example where the present invention is applied to a film camera has been explained according to the first embodiment, the present invention can be also applied to an arbitrary camera, e.g., a digital camera or a video camera that takes a still image or a moving image.

The present invention can be also applied to a lens unit that is used together with a camera main body of such a camera. Additionally, the present invention can be used as a driving unit for an image stabilizing lens in a camera, and also applied to a parallel movement mechanism that moves, e.g., an XY stage in an arbitrary direction. These technologies are known technologies, thereby omitting an explanation thereof.

According to the first embodiment, the three pin-shaped members support the moving frame 114 in parallel with the fixed plate 112. However, four or more pin-shaped members 118 may support the moving frame 114 in parallel, for example. Further, the driving coils 150a to 150c are disposed to the fixed plate 112 as the fixed member, and the driving magnets 152 are attached to the moving frame 114 as the movable member. However, the driving magnets 152 may be disposed to the fixed plate 112, and the driving coils 150a to 150c may be attached to the moving frame 114, respectively.

The example of using the three sets of the driving coils 150a to 150c and the driving magnets 152 has been explained in conjunction with the first embodiment. However, four or more sets of the driving coils 150a to 150c and the driving magnets 152 may be used. Furthermore, the example of using the permanent magnet as each driving magnet 152 has been explained above, an electromagnet or the like may be used.

According to the first embodiment, the magnetic sensors 154a to 154c that detect magnetisms of the driving magnets 152 to measure positions of these magnets are used as the position detecting units. However, position detecting sensors formed of sensors other that the magnetic sensors 154a to 154c that detect positions of the respective driving magnets 152 with respect to the driving coils 150a to 150c may be used as position detecting units.

According to the first embodiment, the respective driving coils 150a to 150c are arranged on the fixed plate 112 in such a manner that the central angle between the driving coils 150a and 150b becomes 90° and the central angle between the driving coil 150c, the driving coil 150a, and the driving coil 150b becomes 135°. However, the driving coil 150c may be arranged in such a manner that the central angle between the driving coils 150b and 150c becomes $(90+\alpha)°$ ($0 \leq \alpha \leq 90$).

In this case, the coil position command signal for the driving coil 150c can be calculated based on the expression (7). The central angle between the driving coils 150a and 150b does not have to be 90°. The central angle between the respective driving coils 150a to 150c may be set to an arbitrary angle from 90° to 180°. For example, each central angle between the three driving coils 150a to 150c is set to 120°. Further, each driving magnet 152 may be arranged at a corresponding position.

According to the first embodiment, the magnetizing boundaries C of the respective driving magnets 152 face the radial direction, but the magnetizing boundary C of each driving magnet 152 can face an arbitrary direction. However, preferably, the magnetizing boundary C of at least one driving magnet 152 may be arranged to face a substantially radial direction.

Figure 24:
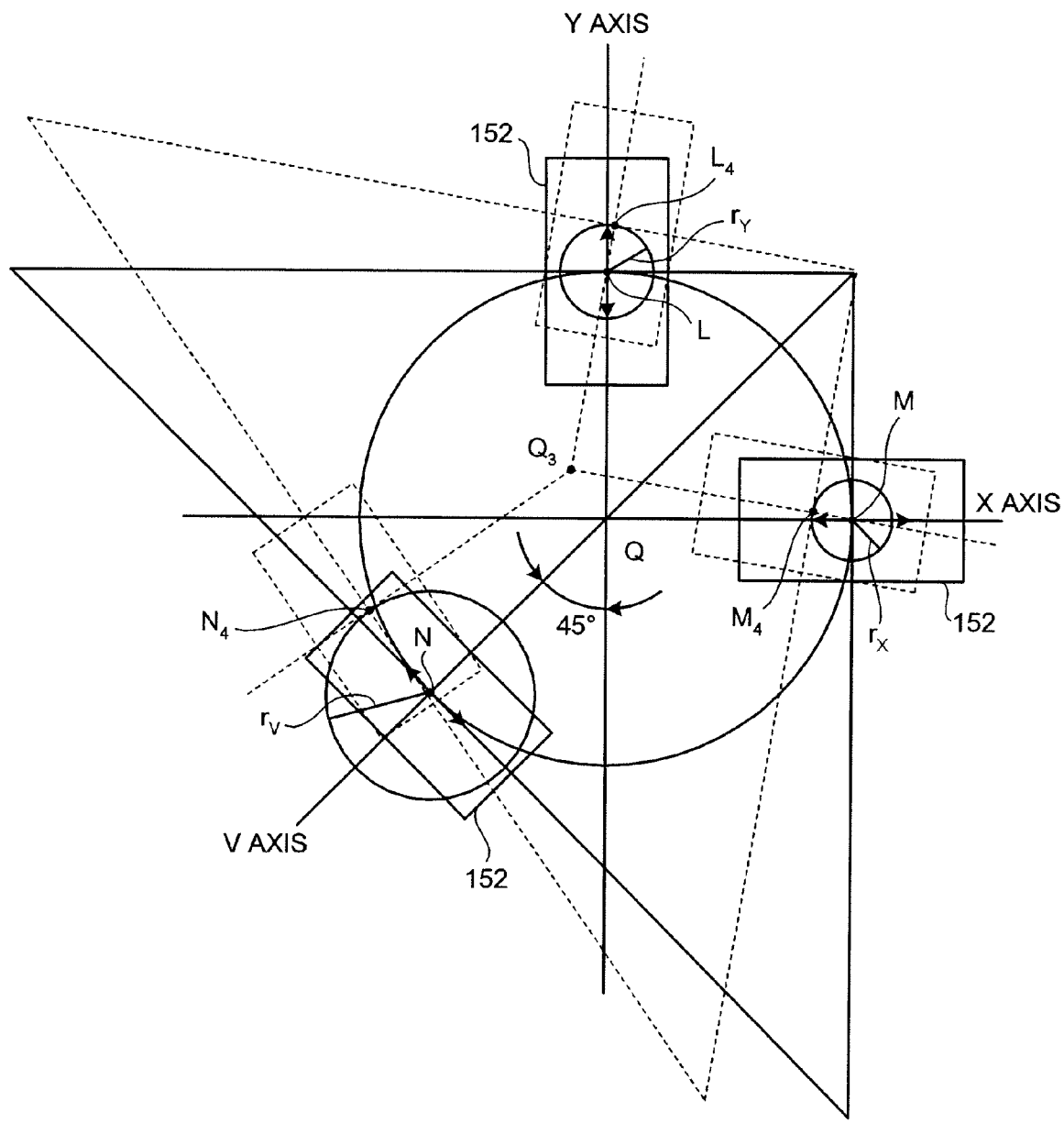
FIG. 24 is a schematic of modification of an arrangement mode of the driving magnets in the actuator provided in the camera according to the first embodiment.

FIG. 24 is a view for explaining an example where an arrangement conformation of the driving magnets 152 is modified in the first embodiment. FIG. 24 depicts a modification when the magnetizing boundaries of the driving magnets 152 corresponding to the driving coils 150a and 150b face a tangential direction of a circle having the point Q at the center and the magnetizing boundary C of the driving magnet 152 corresponding to the driving coil 150c faces a radial direction. Although not shown, the driving coil 150a is arranged at the point L, the driving coil 150b is arranged at the point M, and the driving coil 150c is arranged at the point N, respectively.

According to this modification, it is assumed that the coil position command signal $r_X$ for the driving coil 150a arranged at the point L, the coil position command signal $r_Y$ for the driving coil 150b arranged at the point M, and the coil position command signal $r_V$ for the driving coil 150c arranged at the point N are supplied, respectively. Middle points of the magnetizing boundaries of the respective driving magnets 152 placed on the points L, M, and N at the neutral position of the moving frame 114 are respectively moved to points $L_4$, $M_4$, and $N_4$ based on these coil position command signals, and the central point of the image stabilizing lens 116 is moved from the point Q to a point $Q_3$.

It is to be noted that, according to this modification, the coil position command signal $r_X$ corresponding to the horizontal component in the lens position command signal is supplied to the driving coil 150b arranged at the point M, and the coil position command signal $r_Y$ corresponding to the vertical component in the lens position command signal is supplied to the driving coil 150a arranged at the point L. According to the modification shown in FIG. 24, when the coil position command signals $r_X$ and $r_Y$ are respectively assigned in the expression (8) and the obtained coil position command signal $r_V$ is supplied to the driving coil 150C, the point Q is moved in parallel by a distance $-r_X$ in the direction of the X axis and by a distance $r_Y$ in the direction of the Y axis.

The moving frame 114 and the image stabilizing lens 116 are uniquely positioned based on the respective coil position command signals $r_X$, $r_Y$, and $r_V$ obtained from the lens position command signal in this manner. Therefore, accidental rotation can be assuredly prevented from occurring even if a mechanism that restricts rotation around the optical axis LA is not provided.

Figure 25:
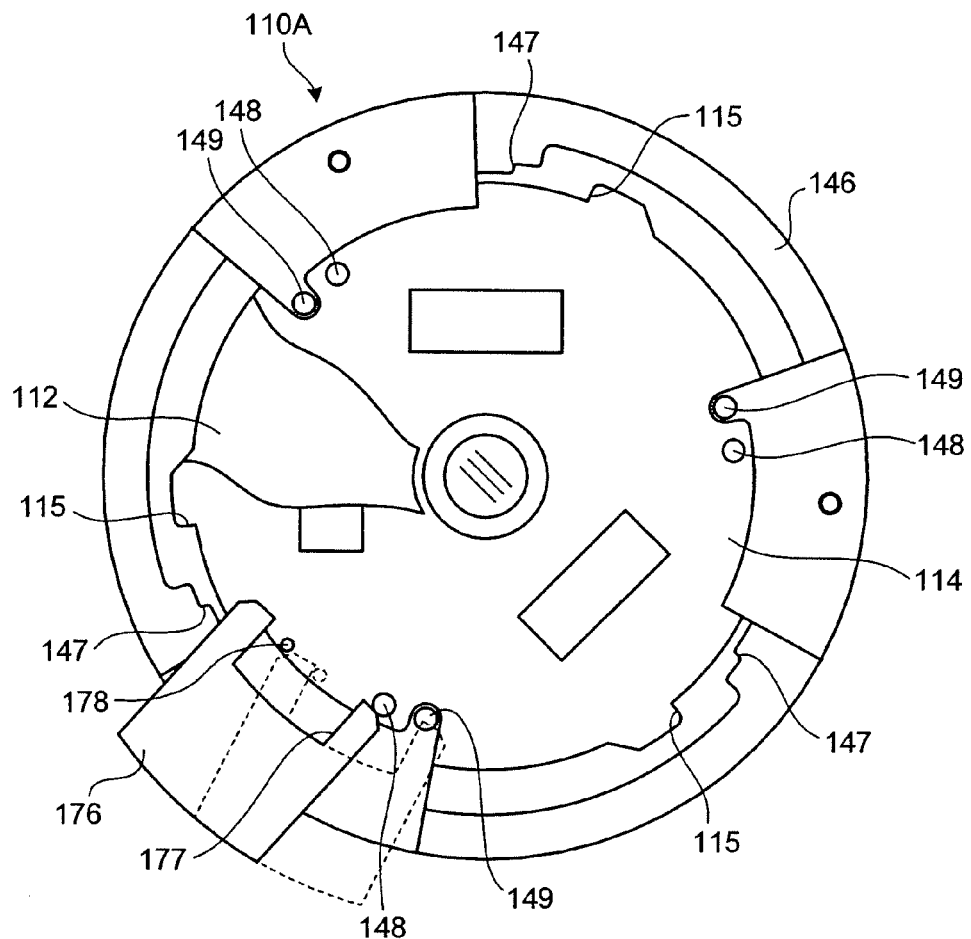
FIG. 25 is a schematic of another modification of the actuator provided in the camera according to the first embodiment.

Another modification of the first embodiment according to the present invention will now be explained with reference to FIG. 25. FIG. 25 is a schematic of another modification of the actuator included in the camera according to the first embodiment. An actuator 110A according to this modification is different from the actuator 110 explained in the first embodiment in that the actuator 110A includes a locking mechanism that locks and fixes the moving frame 114 to the fixed plate 112 when the moving frame 114 is not controlled.

As shown in FIG. 25, in the actuator 110A according to this modification, three engaging protrusions 115 each having a shape protruding outwards are formed on, e.g., an outer peripheral side of the moving frame 114. An annular member 146 arranged to surround the outer peripheral side of the moving frame 114 is disposed to the fixed plate 112 (partially shown), and three engagement portions 147 each formed into a shape that allows engagement with each engaging protrusion 115 are provided on an inner peripheral side of this annular member 146. Three movable-side holding magnets 148 are attached near the outer periphery of the moving frame 114.

Three fixed-side holding magnets 149 positioned to exercise magnetic forces with respect to the movable-side holding magnets 148 are respectively attached at positions corresponding to the movable-side holding magnets 148 at the inner periphery of the annular member 146. A manual locking member 176 that manually operates is provided to be movable in a circumferential direction of the annular member 146 in such a manner that it extends in a radial direction of the actuator 110A from the outer side of the annular member 146.

A concave portion 177 having, e.g., a U-shaped horizontal cross section is formed on a distal end side of this manual locking member 176. It is to be noted that an engaging pin 178 formed to be fitted in the inner side of the U-shaped concave portion 177 and engaged with the manual locking member 176 when locking and fixing the moving frame 114 is provided near the outer periphery of the moving frame 114.

An operation of the actuator 110A will now be briefly explained. When the moving frame 114 in the actuator 110A shown in FIG. 25 is first driven to rotate in the counterclockwise direction, the engaging protrusions 115 on the outer peripheral side of the moving frame 114 engage with the engagement portions 147 of the annular member 146, whereby the moving frame 114 is locked and fixed with respect to the fixed plate 112.

It is to be noted that the movable-side holding magnets 148 provided to the moving frame 114 and the fixed-side holding magnets 149 provided to the annular member 146 do not exercise magnetic forces on each other in such a state as shown in FIG. 25. For example, when the moving frame 114 is driven to rotate in the counterclockwise direction and the movable-side holding magnets 148 move close to the fixed-side holding magnets 149, the fixed-side holding magnets 149 exercise on the moving frame 114 the magnetic force in a direction along which the moving frame 114 is rotated in the clockwise direction.

When the moving frame 114 is driven to rotate in the counterclockwise direction against this magnetic force and the movable-side holding magnets 148 pass through the fixed-side holding magnets 149, the fixed-side holding magnets 149 exercise on the moving frame 114 the magnetic force in a direction along which the moving frame 114 is rotated in the counterclockwise direction. The engaging protrusions 115 are pressed against the engagement portions 147 based on this magnetic force, and an engagement state between the engaging protrusions 115 and the engagement portions 147 is maintained. As a result, even if a power supply of the actuator 110A is turned off to provide no driving force, the engagement state between the engaging protrusions 115 and the engagement portions 147 is maintained, and the moving frame 114 is locked and fixed with respect to the fixed plate 112.

When the manual locking member 176 is manually rotated in the counterclockwise direction as shown in FIG. 25, the engaging pin 178 of the moving frame 114 engages with the U-shaped concave portion 177, and the moving frame 114 is also manually rotated in the counterclockwise direction. As a result, the engaging protrusions 115 are manually engaged with the engagement portions 147.

On the contrary, when the manual locking member 176 is manually rotated in the clockwise direction as shown in FIG. 25, the moving frame 114 is rotated in the clockwise direction, and the engagement state between the engaging protrusions 115 and the engagement portions 147 is released. The actuator 110 according to the first embodiment 1 can rotate the moving frame 114, thereby realizing a locking mechanism like the actuator 110A according to this modification with a simple structure.

A parallel moving device according to a second embodiment of the present invention will now be explained with reference to FIGS. 26 to 28. The parallel moving device according to the second embodiment of the present invention has, e.g., a structure in which the driving unit is eliminated from the actuator 110 used in the camera 100 according to the first embodiment. Therefore, like reference numerals denote the already explained redundant parts, thus omitting an explanation thereof.

Figure 26:
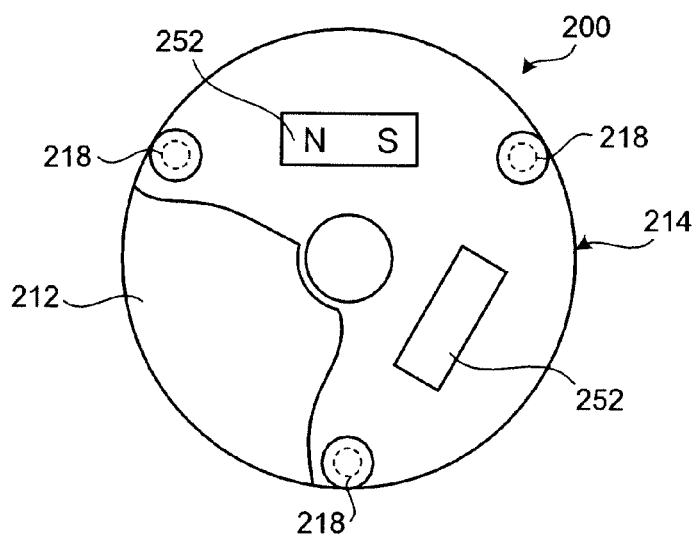
FIG. 26 is a partially cutaway view of a parallel moving device according to a second embodiment of the present invention.

FIG. 26 is a partially cutaway front view of the parallel moving device according to the second embodiment. FIG. 27 is a side cross-section of the parallel moving device according to the second embodiment of the present invention. FIG. 28 is a rear view of the parallel moving device according to the second embodiment. It is to be noted that FIG. 26 is a schematic of a parallel moving device 200 as seen from a fixed plate 212 side. Although the figure of the fixed plate 212 is partially cut away, this drawing is called a front view for the convenience's sake.

Figure 27:
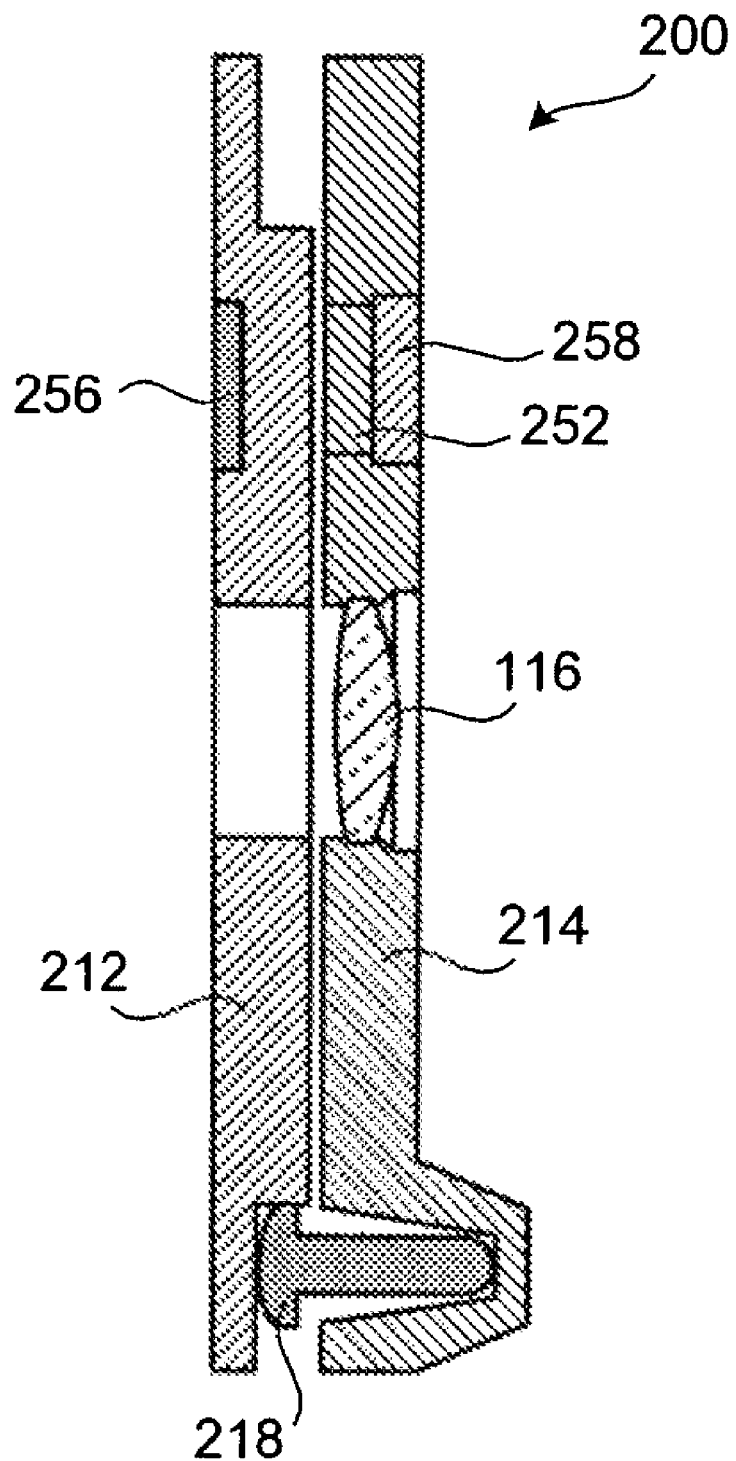
FIG. 27 is a cross-section of the parallel moving device according to the second embodiment.
Figure 28:
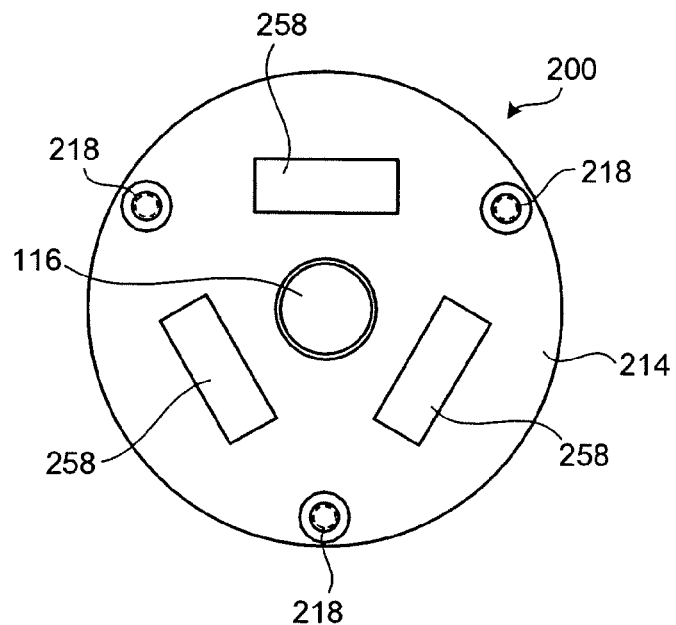
FIG. 28 is a rear view of the parallel moving device according to the second embodiment.

As shown in FIGS. 26 to 28, the parallel moving device 200 includes a fixed plate 212 as a fixed member, a moving frame 214 as a movable member supported to be movable with respect to this fixed plate 212, and three pin-shaped members 218 as support members that support the fixed plate 212 and the moving frame 214 in parallel. It is to be noted that an image stabilizing lens 116 is disposed at the center of the moving frame 214.

The parallel moving device 200 further includes three member magnets 252 disposed on the moving frame 214, attracting yokes 256 disposed at positions corresponding to the respective member magnets 252 on the fixed plates 212, and three back yokes 258 disposed on rear surfaces of the member magnets 252 to direct magnetic fluxes from the respective member magnets 252 toward the attracting yokes 256. It is to be noted that the member magnets 252, the attracting yokes 256, and the back yoke 258 constitute a movable member attracting unit.

The member magnets 252, the attracting yokes 256, and the back yokes 258 are arranged on predetermined circumferences of the fixed plate 212 and the moving frame 214 at intervals of, e.g., a central angle 120°. The member magnets 252, the attracting yokes 256, and the back yokes 258 are formed of rectangular tabular members having substantially the same dimensions or shapes, and positioned in such a manner that each wide side becomes parallel with a tangential line of a predetermined circumference.

As shown in FIG. 27, the member magnets 252, the attracting yokes 256, and the back yokes 258 are arranged on the fixed plate 212 and the moving frame 214 to overlap in a direction of an optical axis LA (not shown). Therefore, the back yokes 258 direct magnetic fluxes from the member magnets 252 toward the attracting yokes 256 at corresponding positions, thereby attracting the moving frame 214 with respect to the fixed plate 212.

Both ends of each of the three pin-shaped members 218 in an axial direction are formed to have curved surfaces that come into contact the fixed plate 212 and the moving frame 214, and each pin-shaped member 218 is arranged to form a predetermined gap between the fixed plate 212 and the moving frame 214. It is to be noted that each pin-shaped member 218 is arranged at a position apart from each adjacent pin-shaped member 218 at an interval of a central angle 120°.

When using the parallel moving device 200 according to the second embodiment, for example, it is good enough to use an arbitrary driving unit to generate a driving force with respect to the moving frame 214, thereby moving the moving frame 214 within a plane parallel to the fixed plate 212. At this moment, inclining the three pin-shaped members 218 in a moving direction allows parallel movement of the moving frame 214 with respect to the fixed plate 212.

Since the three pin-shaped members 218 support the moving frame 214 in parallel, resistance or the like due to contact rarely acts on the moving frame 214. Therefore, according to the parallel moving device 200 of the second embodiment, various kinds of resistance with respect to movement of the moving frame 214 hardly functions, and hence the moving frame 214 can be moved with a small driving force.

An actuator according to a third embodiment of the present invention will now be described with reference to FIGS. 29 to 31. The actuator according to the third embodiment corresponds to, e.g., the actuator 110 used in the camera 100 according to the first embodiment, but it is different from the actuator 110 in that a moving frame is attracted to a fixed plate by using elasticity of an elastic member.

Figure 29:
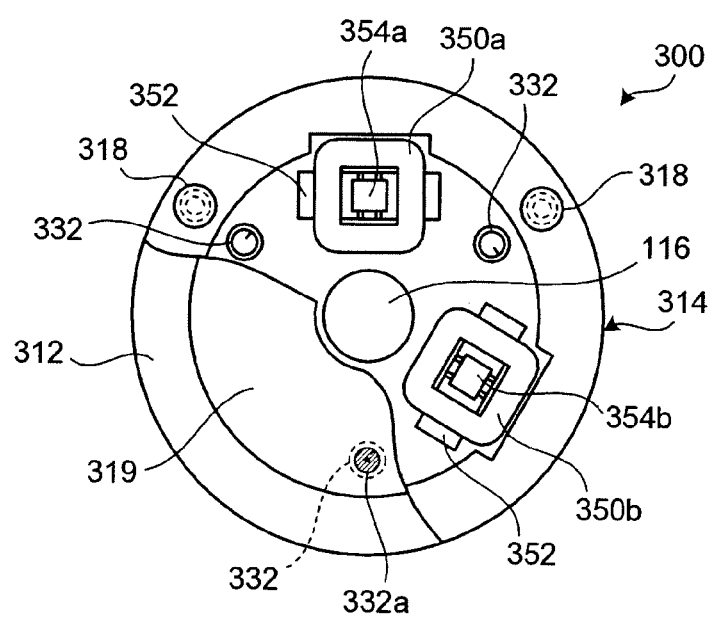
FIG. 29 is a partially cutaway view of an actuator according to a third embodiment of the present invention.

FIG. 29 is a partially cutaway front view of the actuator according to the third embodiment. FIG. 30 is a side cross-section of the actuator according to the third embodiment. FIG. 31 is a rear view of the actuator according to the third embodiment. It is to be noted that FIG. 29 is a view of an actuator 300 as seen from a fixed plate 312 side, and the fixed plate 312 is depicted in a partially cutaway manner. However, this drawing is called a front view for the convenience's sake.

Figure 30:
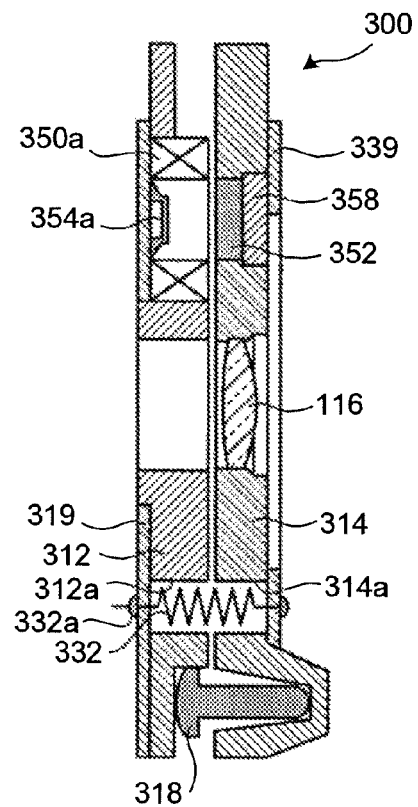
FIG. 30 is a cross-section of the actuator according to the third embodiment.
Figure 31:
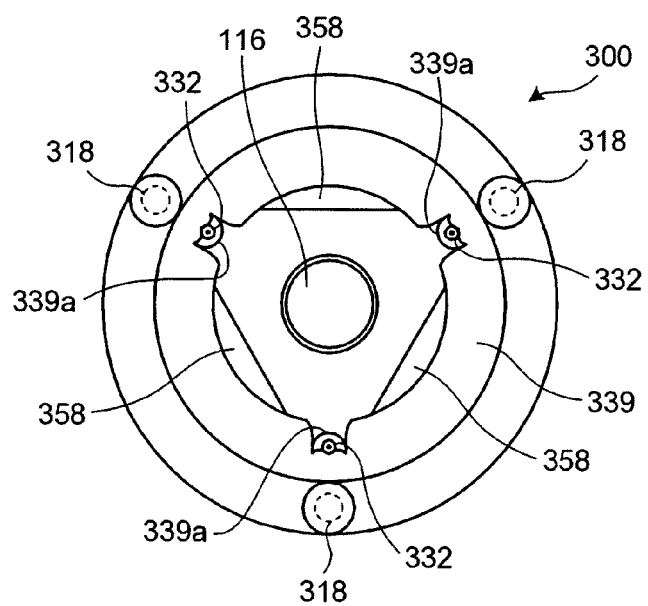
FIG. 31 is a rear view of the actuator according to the third embodiment.

As shown in FIGS. 29 to 31, the actuator 300 includes the fixed plate 312 as a fixed member, a moving frame 314 as a movable member having the image stabilizing lens 116 disposed thereto, and three pin-shaped members 318 as support members. It is to be noted that the three pin-shaped members 318 constitute a movable member supporting unit that fixes the moving frame 314 with respect to the fixed plate 312.

The actuator 300 includes three driving coils 350a, 350b, and 350c (350c is not shown) disposed to the fixed plate 312, three driving magnets 352 (only two magnets are shown) attached at positions in the moving frame 314 corresponding to the respective driving coils 350a to 350c, and magnetic sensors 354a, 354b, and 354c (354c is not shown) as position detecting units arranged in inner voids of the respective driving coils 350a to 350c.

The actuator 300 further includes back yokes 358 disposed on rear sides of the driving magnets 352 to effectively direct magnetic forces from the respective driving magnets 352 toward the fixed plate 312. It is to be noted that the respective driving coils 350a to 350c and the respective driving magnets 352 constitute a driving unit that allows a parallel movement or a rotational motion of the moving frame 314 with respect to the fixed plate 312.

As shown in FIG. 29, the three pin-shaped members 318 are arranged on a circumference outside the circumference having the respective driving coils 350a to 350c of the fixed plate 312 arranged thereon. The three pin-shaped members 318 are arranged at intervals of, e.g., a central angle 120°, and also arranged to be placed between the respective driving coils 350a to 350c.

As shown in FIG. 30, the respective pin-shaped members 318 are arranged between the fixed plate 312 and the moving frame 314 to support both these members in parallel. As a result, the moving frame 314 is supported on a plane parallel with the fixed plate 312. When each pin-shaped member 318 tilts in a moving direction of the moving frame 314, the moving frame 314 is allowed to move in parallel or rotate in an arbitrary direction with respect to the fixed plate 312. Since each pin-shaped member 318 tilts while maintaining a predetermined gap formed between the fixed plate 312 and the moving frame 314, no resistance occurs between the moving frame 314 and the fixed plate 312 due to contact between them when the moving frame 314 moves with respect to the fixed plate 312.

The fixed plate 312 is formed of, e.g., a donut-like discoid member having a space at the center thereof, and a fixed-plate-side substrate 319 likewise formed of a donut-like discoid number is disposed at a predetermined position on a concentric circle of this fixed plate 312. The moving frame 314 is also formed of a substantially-donut-like discoid member, and a moving-frame-side substrate 339 likewise formed of a donut-like discoid member is disposed at a predetermined position of a concentric circle.

As shown in FIG. 30, three through holes 312a and three through holes 314a are respectively provided on the circumferences of the fixed plate 312 and the moving frame 314 at intervals of, e.g., a central axis 120°, and positions of the respective through holes 312a and 314a are matched with each other. Springs 332 as, e.g., elastic members are respectively arranged in the through holes 312a and 314a.

One end of each spring 332 linearly extends in a direction of an axis line of the spring 332, and a hook (not shown) is formed at the other end. The linear end of each spring 332 is passed through a small hole (not shown) formed at a position corresponding to each through hole 312a in the fixed-plate-side substrate 319, and directly connected with the fixed-plate-side substrate 319 by using, e.g., solder 332a. On the other hand, the end of each spring 332 having a hook formed thereon is caught on a claw 339a formed at a position corresponding to each through hole 314a in the moving-frame-side substrate 339, and directly connected with the moving-frame-side substrate 339 by using the solder 332a or the like.

Since the hook of each spring 332 is caught on the claw 339a in a stretched state, the moving frame 314 is pulled and attracted toward the fixed plate 312 by an elastic force of each spring 332. As a result, the curved surfaces of both ends of each pin-shaped body 318 in the axial direction come into contact the fixed plate 312 and the moving frame 314 between these members, thereby realizing a structure that can sufficiently exercise its function.

The through holes 312a and 314a are formed into sizes having sufficient diameters so that each spring 332 does not come into contact inner walls of the through holes 312a and 314a when the moving frame 314 moves in parallel with respect to the fixed plate 312 in an actual use range. Since the moving-frame-side substrate 339 disposed on the moving frame 314 and the fixed-plate-side substrate 319 disposed on the fixed plate 312 are coupled with each other through each spring 332, this spring 332 can be utilized as, e.g., a conductor that transmits an electric signal between the fixed-plate-side substrate 319 and the moving-frame-side substrate 339.

The operation of the actuator 300 according to the third embodiment is the same as that of the actuator 110 according to the first embodiment of the present invention except that the moving frame 314 is attracted to the fixed plate 312 by each spring 332, thereby omitting an explanation thereof. It is to be noted that, according to the actuator 300 of the third embodiment of the present invention, resistance or the like caused due to contact the moving frame 314 does not occur, and hence the moving frame 314 can be smoothly moved by using a small driving force.

Although each of pin-shaped members 118B18, and 318 is formed of, e.g., a hard material, a hard resin material, or a metallic material, it may be formed of a soft material, a soft resin material, a rubber-based material, or a flexible material. In this case, it is good enough to form the pin-shaped member 118B18, or 318 into a shape that acquires appropriate strength by, e.g., increasing a thickness or an external diameter of the pin-shaped member.

According to the embodiments described above, a movable member can be smoothly and accurately translated or rotated in an arbitrary direction within a predetermined plane.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The present document incorporates by reference the entire contents of Japanese priority document, 2005-350346 filed in Japan on Dec. 5, 2005.

What is claimed is:

1. A parallel moving device comprising:
   a fixed member that is provided on a side of a casing;
   a movable member provided on a side of an optical system; and
   a support member that is provided between the fixed member and the movable member to support both of the fixed member and the movable member in such a manner that one end contacts the fixed member and another end contacts the movable member while enabling movement of the movable member in a direction substantially perpendicular to an optical axis of the optical system, wherein
   the support member is constituted of a pin-shaped member that supports the movable member in parallel with respect to the fixed member, of which ends that contact the fixed member and the movable member respectively have curved surfaces, and that tilts in the substantially perpendicular direction in response to movement of the movable member about the one end as a fulcrum.

2. The parallel moving device according to claim 1, wherein, the curved surfaces have different curvatures.

3. The parallel moving device according to claim 1, wherein, the curved surface of the end contacting the fixed member has a larger curvature than the curved surface of the end contacting the movable member.

4. The parallel moving device according to claim 1, further comprising:
   a position detecting unit that includes
     at least three driving coils that are provided at either one of the fixed member and the movable member; and
     a plurality of driving magnets that are provided at another one of the fixed member and the movable member such that each of the driving magnets is arranged at a portion corresponding to one of the driving coils respectively, the position detecting unit that detects positions of the driving magnets with respect to the driving coils based on action of a magnetic field; and
   a control unit that controls movement of the movable member based on a result of detection by the position detecting unit so as to cancel vibration externally applied.

5. The parallel moving device according to claim 1, wherein the support member supports the fixed member and the movable member so that a predetermined gap is formed between the fixed member and the movable member.

6. The parallel moving device according to claim 5, the support member supports the movable member in parallel while maintaining a distance in the predetermined gap when the support member tilts in response to the movement of the movable member.

7. The parallel moving device according to according to claim 1, further comprising a rotation preventing unit that prevents the support member from rotating about an axis parallel to the optical axis at the time of moving the movable member.

8. An actuator comprising:
   a fixed member that is provided on a side of a casing;
   a movable member provided on a side of an optical system;
   a support member that is provided between the fixed member and the movable member to support both of the fixed member and the movable member so that one end contacts the fixed member and another end contacts the movable member while enabling movement of the movable member in a direction substantially perpendicular to an optical axis of the optical system;
   at least three driving coils that are provided at either one of the fixed member and the movable member;
   a plurality of driving magnets that are provided at another one of the fixed member and the movable member such that each of the driving magnets is arranged at a portion corresponding to the driving coils respectively;
   a position detecting unit that detects positions of the driving magnets with respect to the driving coils based on action of a magnetic field; and
   a control unit that generates a coil position signal for each of the driving coils based on a signal indicating a position to which the movable member is to be moved so as to cancel vibration externally applied, and that controls a driving current to be fed to each of the driving coils, based on the coil position signal and a result of detection by the position detecting unit, wherein
   the support member is constituted of a pin-shaped member that supports the movable member in parallel with respect to the fixed member, of which ends that contact the fixed member and the movable member respectively have curved surfaces, and that tilts in the substantially perpendicular direction between the fixed member and the movable member in response to movement of the movable member about the one end as a fulcrum.

9. A lens unit comprising:
   a lens barrel that accommodates a lens;
   a fixed member that is mounted on the lens barrel;
   a movable member on which an image stabilizing lens is mounted;
   a support member that is provided between the fixed member and the movable member to support both of the fixed member and the movable member so that one end contacts the fixed member and another end contacts the movable member while enabling movement of the movable member in a direction substantially perpendicular to an optical axis of the optical system;
   at least three driving coils that are provided at either one of the fixed member and the movable member;
   a plurality of driving magnets that are provided at another one of the fixed member and the movable member such that each of the driving magnets is arranged at a portion corresponding to one of the driving coils respectively;
   a position detecting unit that detects positions of the driving magnets with respect to the driving coils based on action of a magnetic field;
   a vibration detecting unit that detects vibration of the lens barrel;
   a lens position signal generating unit that generates a lens position signal indicating a position to which the image stabilizing lens is to be moved, based on a result of detection by the vibration detecting unit; and a control unit that generates a coil position signal for each of the driving coils based on the lens position signal, and that controls a driving current to be fed to each of the driving coils, based on the coil position signal and a result of detection by the position detecting unit, wherein the support member is formed of a pin-shaped member that supports the movable member in parallel with respect to the fixed member, of which ends that contact the fixed member and the movable member respectively have curved surfaces, and that tilts in the substantially perpendicular direction in response to movement of the movable member about the one end as a fulcrum.

10. A camera comprising a lens unit that includes a lens barrel that accommodates a lens;

a fixed member that is mounted on the lens barrel;

a movable member on which an image stabilizing lens is mounted;

a support member that is provided between the fixed member and the movable member to support both of the fixed member and the movable member so that one end contacts the fixed member and another end contacts the movable member while enabling movement of the movable member in a direction substantially perpendicular to an optical axis of the image stabilizing lens;

at least three driving coils that are provided at either one of the fixed member and the movable member;

a plurality of driving magnets that are provided at another one of the fixed member and the movable member such that each of the driving magnets is arranged at a portion corresponding to one of the driving coils respectively;

a position detecting unit that detects positions of the driving magnets with respect to the driving coils based on action of a magnetic field;

a vibration detecting unit that detects vibration of the lens barrel;

a lens position signal generating unit that generates a lens position signal indicating a position to which the image stabilizing lens is to be moved, based on a result of detection by the vibration detecting unit; and a control unit that generates a coil position signal for each of the driving coils based on the lens position signal, and that controls a driving current to be fed to each of the driving coils, based on the coil position signal and a result of detection by the position detecting unit, wherein the support member is formed of a pin-shaped member that supports the movable member in parallel with respect to the fixed member, of which ends that contact the fixed member and the movable member respectively have curved surfaces, and that tilts in the substantially perpendicular direction in response to movement of the movable member about the one end as a fulcrum.

* * * * *